(12) United States Patent
Tanaka et al.

(10) Patent No.: US 10,903,696 B2
(45) Date of Patent: Jan. 26, 2021

(54) RECTIFIER AND RECTENNA DEVICE

(71) Applicant: Mitsubishi Electric Corporation, Chiyoda-ku (JP)

(72) Inventors: Toshiyuki Tanaka, Chiyoda-ku (JP); Jun Shimokawatoko, Chiyoda-ku (JP); Masaomi Tsuru, Chiyoda-ku (JP); Atsushi Yamamoto, Chiyoda-ku (JP); Yukihiro Homma, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/649,907

(22) PCT Filed: Aug. 29, 2018

(86) PCT No.: PCT/JP2018/031984
§ 371 (c)(1),
(2) Date: Mar. 23, 2020

(87) PCT Pub. No.: WO2019/097806
PCT Pub. Date: May 23, 2019

(65) Prior Publication Data
US 2020/0251935 A1 Aug. 6, 2020

(30) Foreign Application Priority Data
Nov. 15, 2017 (JP) ................. 2017-219950

(51) Int. Cl.
*H02J 50/27* (2016.01)
*H01Q 1/24* (2006.01)
*H02M 7/217* (2006.01)
(52) U.S. Cl.
CPC ............. *H02J 50/27* (2016.02); *H01Q 1/248* (2013.01); *H02M 7/2176* (2013.01)

(58) Field of Classification Search
CPC ......... H02J 50/27; H01Q 13/08; H01Q 1/248; H02M 7/2176; H04B 5/0037
See application file for complete search history.

(56) References Cited

U.S. PATENT DOCUMENTS

| | | | |
|---|---|---|---|
| 2003/0197598 A1* | 10/2003 | Hayashi | G06K 19/0723 455/41.1 |
| 2015/0372541 A1* | 12/2015 | Guo | H02J 50/50 307/104 |

(Continued)

FOREIGN PATENT DOCUMENTS

| | | |
|---|---|---|
| CN | 1581626 A | 2/2005 |
| JP | 2009-65726 A | 3/2009 |

(Continued)

OTHER PUBLICATIONS

International Search Report dated Nov. 6, 2018 in PCT/JP2018/031984 filed on Aug. 29, 2018, 2 pages.

(Continued)

*Primary Examiner* — Rexford N Barnie
*Assistant Examiner* — Rasem Mourad
(74) *Attorney, Agent, or Firm* — Oblon, McClelland, Maier & Neustadt, L.L.P.

(57) ABSTRACT

The rectifying device converts high-frequency power input from an input terminal into direct current power and outputs the direct current power from an output terminal. The rectifying device includes a rectifier that converts the high-frequency power into the direct current power, and an impedance changer having one end connected to a connection point of the rectifier and the output terminal and the other end to which reference voltage is applied such that impedance varies while having a negative correlation with respect to an absolute value of voltage of the direct current power. When the absolute value of the voltage of the direct current power is greater than a predetermined value that is (Continued)

lower than reverse withstand voltage of the rectifying element included in the rectifier, the impedance of the impedance changer as viewed from the rectifier is a value regarded as corresponding to a short circuit.

8 Claims, 23 Drawing Sheets

(56) References Cited

U.S. PATENT DOCUMENTS

| | | | |
|---|---|---|---|
| 2016/0307086 A1 | 10/2016 | Nozoe | |
| 2017/0047781 A1* | 2/2017 | Stanislawski | H02J 7/025 |

FOREIGN PATENT DOCUMENTS

| | | | | |
|---|---|---|---|---|
| JP | 2010-28947 | A | | 2/2010 |
| JP | 2013-226020 | A | | 10/2013 |
| JP | 2014-121137 | A | | 6/2014 |
| JP | 2014121137 | A | * | 6/2014 |
| JP | 2015-89239 | A | | 5/2015 |
| JP | 2015089239 | A | * | 5/2015 |
| JP | 2015-130779 | A | | 7/2015 |
| JP | 2015-192484 | A | | 11/2015 |
| KR | 1997-0002782 | Y1 | | 4/1997 |
| KR | 10-0834691 | B1 | | 6/2008 |

OTHER PUBLICATIONS

Office Action dated Jul. 28, 2020 in corresponding Korean Patent Application No. 10-2020-7013200 (with English Translation), 10 pages.

The extended European search report dated Nov. 19, 2020 in corresponding EP Patent Application No. 18879429.1 (9 pages).

* cited by examiner

RECTIFIER AND RECTENNA DEVICE

CROSS-REFERENCE TO RELATED APPLICATION

The present application is a national stage application of PCT/JP2018/031984, filed Aug. 29, 2018, which claims priority to Japanese Patent Application No. 2017-219950, filed Nov. 15, 2017. The benefit of priority is claimed to each of the foregoing, and the entire contents of each of the foregoing are incorporated herein by reference.

TECHNICAL FIELD

The present disclosure relates to a rectifying device that converts high-frequency power into direct current power, and a rectenna apparatus.

BACKGROUND ART

Examples of a rectifying device that converts high-frequency power into direct current power include a rectifying device having a constant voltage diode that is a Zener diode disposed at a pair of output-side lines of a rectifier with a rectifying element to absorb a surge in voltage occurred across the pair of lines (for example, see Patent Literature 1). In this rectifying device, the reverse withstand voltage of a constant voltage diode is set less than or equal to the reverse withstand voltage of the rectifying element. With this configuration, the voltage applied across the rectifying element can be suppressed to be less than or equal to the reverse withstand voltage.

CITATION LIST

Patent Literature

Patent Literature 1: Unexamined Japanese Patent Application Kokai Publication No. 2015-192484

SUMMARY OF INVENTION

Technical Problem

When power density of microwaves received by a rectenna fluctuates over time, high power is sometimes input to a rectifying device, and the rectifying device may break down. One of the main causes of the breakdown of the rectifying device is an application to the rectifying element of reverse voltage that is higher than the reverse withstand voltage of the rectifying element.

In the rectifying device disclosed in Patent Literature 1, direct current voltage output by the rectifying element equals the reverse voltage value of a constant voltage diode. Since the voltage applied across the rectifying element results from voltage addition of direct current voltage and an amplitude of high-frequency voltage, when the reverse voltage of the constant voltage diode is set to the value that is the same as that of the reverse withstand voltage of the rectifying element, the reverse voltage applied across the rectifying element exceeds the reverse withstand voltage, and thus the rectifying device may break down. Therefore, reliability of the rectifying device is low.

In order to solve the aforementioned shortcoming, an objective of the present disclosure is to provide a rectifying device and a rectenna apparatus that are highly reliable.

Solution to Problem

In order to attain the aforementioned objective, a rectifying device according to the present disclosure converts high-frequency power input from an input terminal into direct current power and outputs the direct current power from the output terminal. The rectifying device includes a rectifier and an impedance changer. The rectifier has a rectifying element, converts the high-frequency power into the direct current power, and outputs the direct current power to the output terminal. The impedance changer has one end connected to a connection point of the rectifier and the output terminal, and the other end to which reference voltage is applied. Impedance of the impedance changer varies while having a negative correlation with respect to an absolute value of voltage of the direct current power. When the absolute value of the voltage of the direct current power is greater than a predetermined value that is less than or equal to an absolute value of reverse withstand voltage of the rectifying element, the impedance of the impedance changer is a value regarded as corresponding to a short circuit as viewed from the rectifier.

Advantageous Effects of Invention

The rectifying device according to the present disclosure prevents the reverse voltage that exceeds the reverse withstand voltage from being applied across the rectifying element because the impedance of the impedance changer is a value regarded as corresponding to a short circuit as viewed from the rectifier when the absolute value of the voltage of the direct current power is greater than the predetermined value that is less than or equal to the absolute value of the reverse withstand voltage of the rectifying element. As a result, the rectifying device and the rectenna apparatus that are highly reliable can be provided.

DESCRIPTION OF EMBODIMENTS

A rectifying device according to embodiments of the present disclosure is described below in detail with reference to the drawings. Throughout the drawings, components that are the same or equivalent are assigned the same reference signs.

Embodiment 1

Figure 1:
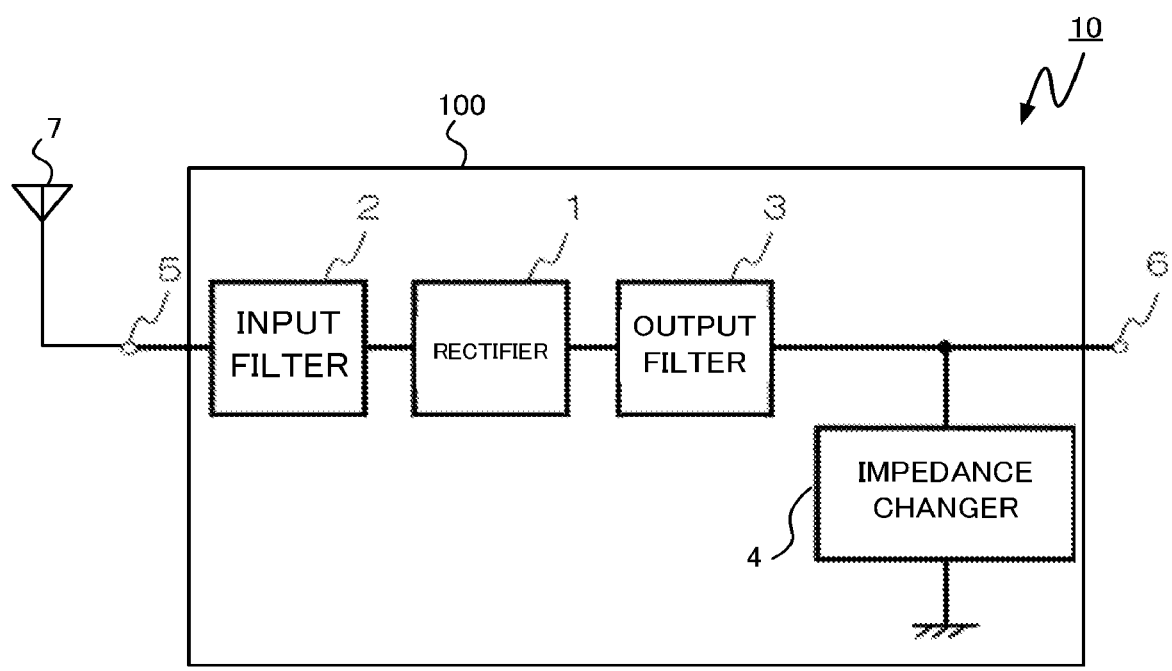
FIG. 1 is a block diagram illustrating a configuration of a rectenna apparatus according to Embodiment 1 of the present disclosure.

As illustrated in FIG. 1, a rectenna apparatus 10 that is used for microwave wireless power transmission includes an antenna 7 and a rectifying device 100. The antenna 7 receives a high frequency wave and sends the received high frequency wave to the rectifying device 100. The rectifying device 100 according to Embodiment 1 of the present disclosure performs radio frequency (RF)-direct current (DC) conversion to convert high-frequency power input from an antenna 7 via an input terminal 5 into direct current power and outputs the direct current power from the output terminal 6. The rectifying device 100 includes a rectifier 1 that converts the high-frequency power into the direct current power and outputs the direct current power to the output terminal 6, an input filter 2, an output filter 3, and an impedance changer 4 in which impedance varies while having a negative correlation with respect to an absolute value of voltage of the direct current power.

The input filter 2 is disposed in the circuit between the input terminal 5 and the rectifier 1, performs harmonic processing to decrease a harmonic component and blocks a direct current component. The rectifier 1 includes a rectifying element, converts the high-frequency power input from the input terminal 5 via the input filter 2 into the direct current power and outputs the direct current power. The rectifying element is an element that has the function of allowing flow of current only in one direction. The element includes, for example, a diode. The output filter 3 is disposed in the circuit between the rectifier 1 and the output terminal 6, performs the harmonic processing to decrease the harmonic component that occurs during the processing by the rectifier 1, and smooths the direct current power.

The impedance changer 4 has one end connected to a connection point of the output filter 3 and the output terminal 6, and the other end to which reference voltage is applied. The case where the other end of the impedance changer 4 is grounded is described as an example. The impedance of the impedance changer 4 varies while having the negative correlation with respect to the absolute value of the voltage of the direct current power. Specifically, the impedance of the impedance changer 4 is a value regarded as corresponding to a short circuit as viewed from the rectifier 1 when the absolute value of the voltage of the direct current power is greater than a predetermined value that is less than or equal to the absolute value of a reverse withstand voltage of the rectifying element. Furthermore, the impedance of the impedance changer 4 is a value regarded as corresponding to an open circuit as viewed from the rectifier 1 when the absolute value of the voltage of the direct current power is less than or equal to the above-described predetermined value.

Figure 2:
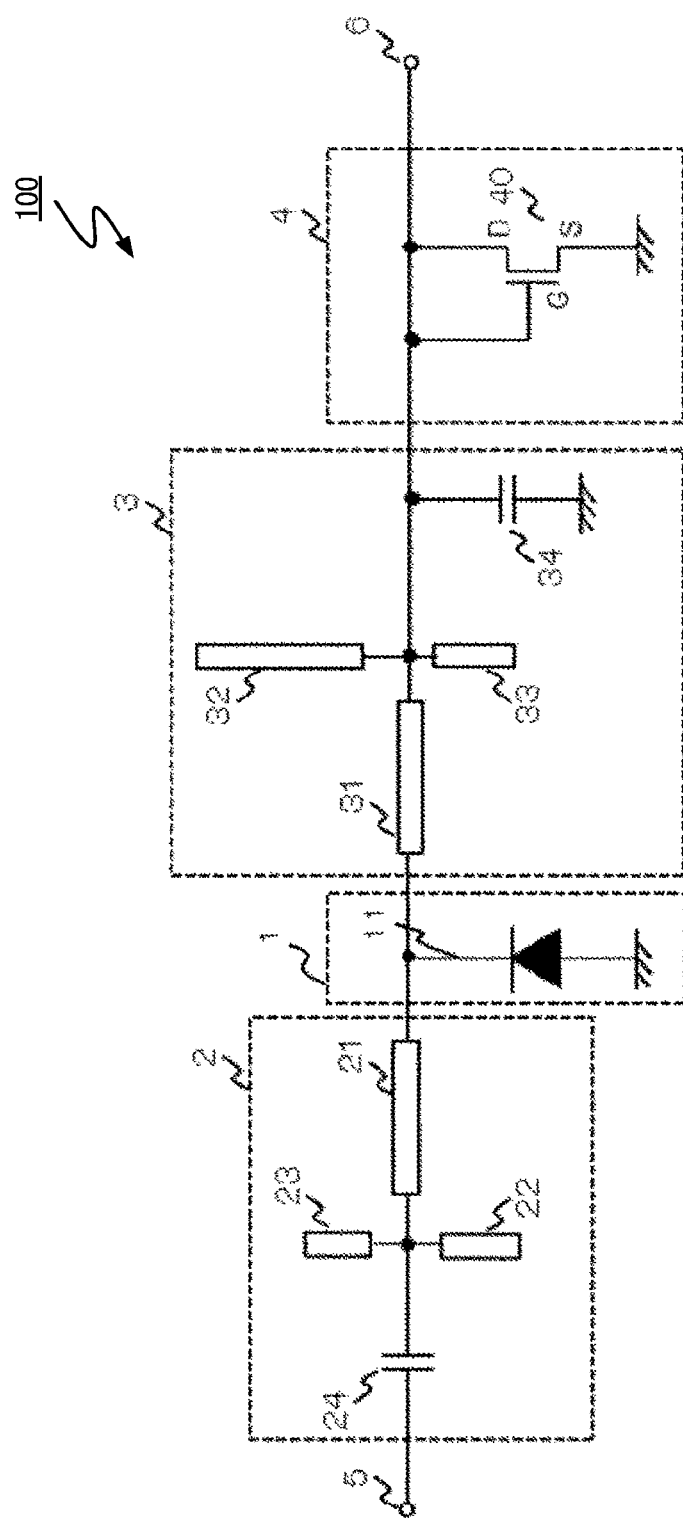
FIG. 2 is a diagram illustrating an example of a circuit configuration of a rectifying device according to Embodiment 1.

The configuration of the rectifying device 100 is described in detail. As illustrated in FIG. 2, the input filter 2 includes a transmission line 21 having a line length corresponding to one quarter wavelength of a fundamental wave, an open stub 22 having a line length corresponding to one quarter wavelength of a second order harmonic, an open stub 23 having a line length corresponding to one quarter wavelength of a third order harmonic, and a direct-current-blocking capacitance element 24. Note that the fundamental wave is a predetermined frequency component among the radio waves to be received by the rectenna apparatus 10. The second order harmonic is a frequency component that is twice the frequency of the fundamental wave, while the third order harmonic is a frequency component that is three times the frequency of the fundamental wave. The direct-current-blocking capacitance element 24 has one end connected to the input terminal 5 that serves as an input end of the input filter 2. The transmission line 21 has one end connected to the rectifier 1 that serves as an output end of the input filter 2. The direct-current-blocking capacitance element 24 has the other end connected to the other end of the transmission line 21 opposite to the one end of the transmission line 21 that is connected to the rectifier 1 and a connection point of the open stub 22 and the open stub 23.

The rectifier 1 includes a rectifying element 11 that includes a diode. The rectifying element 11 is oriented so that the rectifier 1 outputs positive direct current voltage. That is, the anode of the rectifying element 11 is grounded, while the cathode of the rectifying element 11 connects to the output end of the input filter 2 and an input end of the output filter 3.

The output filter 3 includes a transmission line 31 having a line length corresponding to one quarter wavelength of the fundamental wave, an open stub 32 having a line length corresponding to one quarter wavelength of the fundamental wave, an open stub 33 having a line length corresponding to one quarter wavelength of a second order harmonic, and a smoothing capacitance element 34 that smooths a direct current. The transmission line 31 has one end connected to the rectifier 1 that serves as the input end of the output filter 3. The smoothing capacitance element 34 has one end that is grounded. The transmission line 31 has the other end connected to a connection point of the open stub 32 and the open stub 33, and the other end of the smoothing capacitance element 34 opposite to the one end that is grounded. Due to including of the input filter 2 and the output filter 3 that are illustrated in FIG. 2, the rectifying element 11 can achieve class F operation, and the rectifying device 100 can obtain high RF-DC conversion efficiency.

The impedance changer 4 includes a switching element that switches an electrically conductive state and an electrically non-conductive state of an electric path upon application of a control signal to a control terminal. The case where the impedance changer 4 includes a field effective transistor (hereinafter referred to as FET) switch 40 is described as an example. An FET switch 40 is a switch that includes an enhancement-type FET. The FET switch 40 has a source terminal that is grounded, a drain terminal and a gate terminal that are connected to connection points of the output filter 3 and the output terminal 6. In other words, the drain terminal and the gate terminal have substantially the same voltage as each other and are both connected to the output terminal 6. The gate terminal of the FET switch 40 corresponds to the control terminal of the above-described switching element.

In the rectifying device 100, when the load connected to the output terminal 6 is constant, voltage $V_{dc}$ of the direct current power output from the output terminal 6 increases as the input high-frequency power increases, and thus the direct current increases. However, when the input high-frequency power is constant, as impedance of a circuit of the output side directly connected in series to the rectifying element 11 decreases, the direct current increases and the voltage $V_{dc}$ decreases, and thus an amplitude of the high-frequency voltage $V_{amp}$ applied across the rectifying element 11 decreases.

Figure 3:
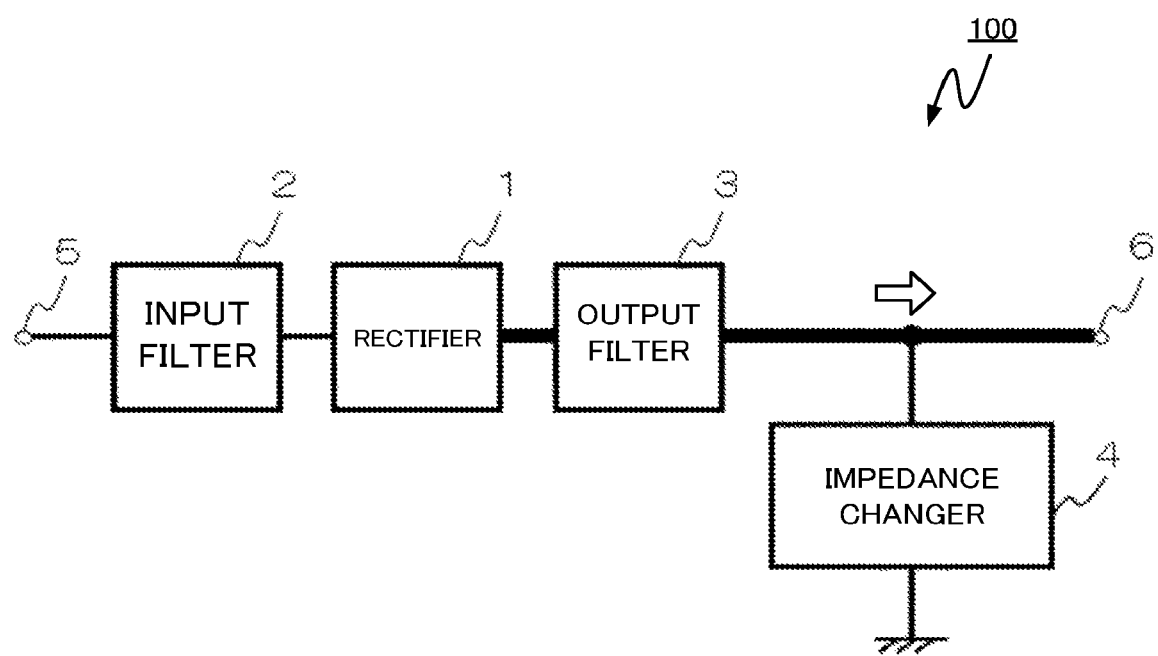
FIG. 3 is a diagram indicating a current flow in the rectifying device according to Embodiment 1.

When the direct current impedance of the impedance changer 4 is a value regarded as corresponding to an open circuit as viewed from the rectifier 1 due to low voltage of the high-frequency power input to the rectifying device 100, the direct current flowing from the rectifier 1 to the output terminal 6 through the output filter 3, as illustrated by thick solid lines in FIG. 3, does not leak to the impedance changer 4. Thus, the rectifying device 100 obtains the RF-DC conversion efficiency equivalent to that obtained in the case without the impedance changer 4.

Figure 4:
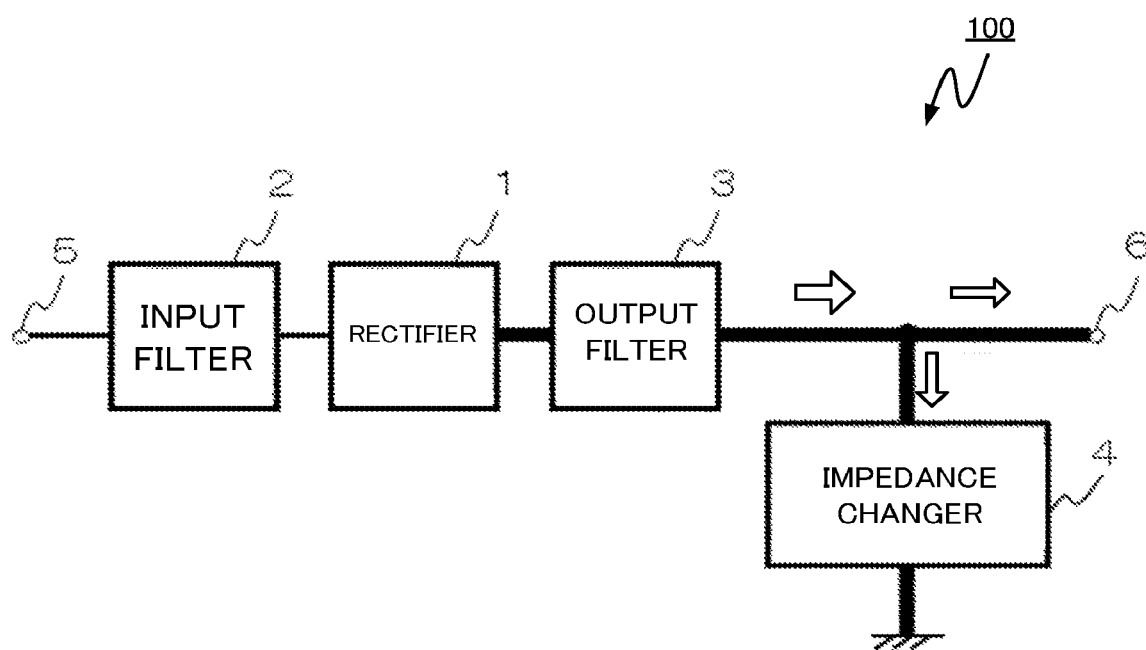
FIG. 4 is a diagram indicating a current flow in the rectifying device according to Embodiment 1.

When the direct current impedance of the impedance changer 4 is a value regarded as corresponding to a short circuit as viewed from the rectifier 1 due to the large voltage $V_{dc}$ obtained because of the large high-frequency power that is input to the rectifying device 100, part of the direct current flowing from the rectifier 1 to the output terminal 6 through the output filter 3, as illustrated as thick solid lines in FIG. 4, leaks to the impedance changer 4. Direct current impedance of a circuit of the output side as viewed from the rectifier 1 is parallel impedance of the impedance changer 4 and a load connected to the output terminal 6. That is, in contrast to the case without the impedance changer 4, the impedance of the circuit of the output side as viewed from the rectifier 1 is low. In the case where the input high-frequency power is constant, when the impedance of the circuit of the output side as viewed from the rectifier 1 is low, the voltage $V_{dc}$ is low and the amplitude of the high-frequency voltage $V_{amp}$ applied across the rectifying element 11 is low. That is, in contrast to the case without the impedance changer 4, reverse voltage applied across the rectifying element 11 can be prevented from becoming excessive.

The operation of the rectifying device 100 is described below. Upon input of the high-frequency power from the antenna 7 into the input terminal 5 of the rectifying device 100, the input filter 2 decreases the harmonic component and blocks the direct current component of the high frequency power and then such high frequency power is input into the rectifier 1. Due to repeated turning on and off of the rectifying element 11 included in the rectifier 1 at every half cycle, the output of the rectifier 1 includes a high-order harmonic and direct current voltage (offset) occurs in a direction in accordance with the polarity of the rectifying element 11. The output of the rectifier 1 is smoothed by the output filter 3 and the direct current power is output from the output terminal 6. The impedance of the impedance changer 4 varies while having a negative correlation with respect to an absolute value of the voltage $V_{dc}$ of the direct current power output by output terminal 6. Since the direct current voltage output by the rectifier 1 is positive voltage, the impedance of the impedance changer 4 varies while having the negative correlation with respect to the voltage $V_{dc}$.

Figure 5:
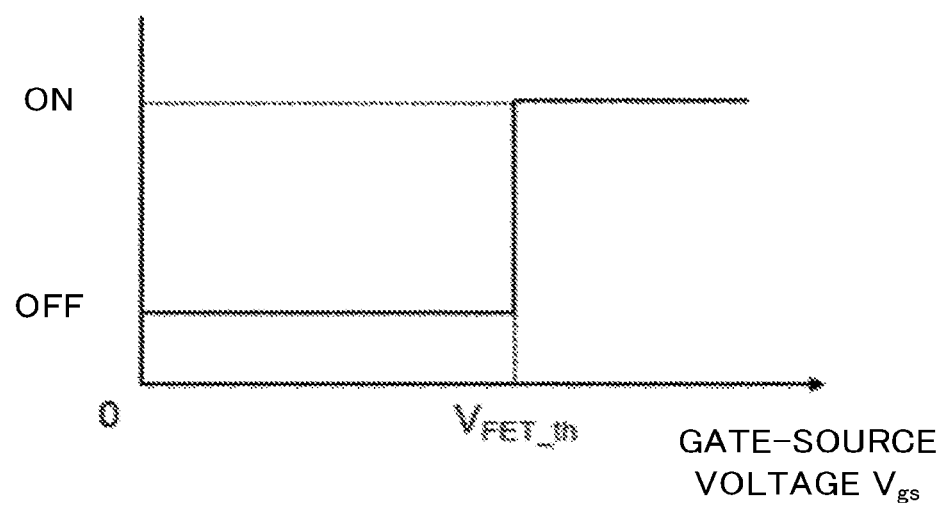
FIG. 5 is a diagram indicating a relation between a status of an FET switch according to Embodiment 1 and gate-source voltage $V_{gs}$.
Figure 6:
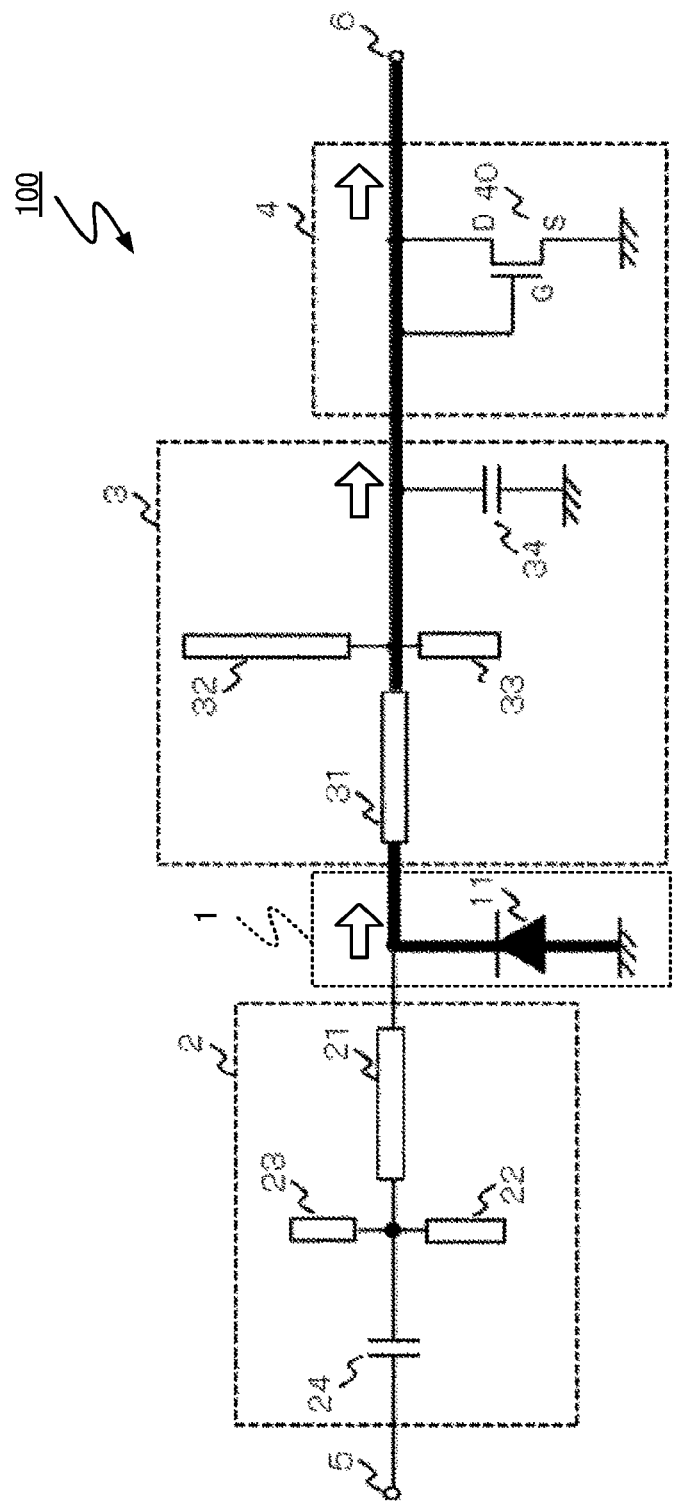
FIG. 6 is a diagram indicating a current flow in the rectifying device according to Embodiment 1.

Impedance change of the impedance changer 4 is described below. The voltage $V_{dc}$ is applied to the gate terminal of the FET switch 40. FIG. 5 is a diagram indicating a relation between the status of the FET switch 40 and gate-source voltage $V_{gs}$. The vertical axis and the horizontal axis indicate respectively the status of the FET switch 40 and the gate-source voltage $V_{gs}$. Since the gate-source voltage $V_{gs}$ of the FET switch 40 and the voltage $V_{dc}$ are the same as each other, $V_{gs}=V_{dc}$ is established. The gate-source voltage $V_{gs}$ when switching an electrically conductive state and an electrically non-conductive state between a drain and a source of the FET switch 40 is taken to be threshold voltage $V_{FET\_th}$. Note that the threshold voltage $V_{FET\_th}$ is set to a value less than or equal to the reverse withstand voltage of the rectifying element 11. When voltage $V_{dc} \leq$ threshold voltage $V_{FET\_th}$ is established, the drain-source state of the FET switch 40 is electrically non-conductive, thus the impedance of the impedance changer 4 is a value regarded as corresponding to an open circuit. FIG. 6 indicates the flow of the direct current occurred at that time as thick solid lines. As illustrated in FIG. 6, the direct current does not leak between the drain and source of the FET switch 40. In addition, since a direct current impedance of the output filter 3 is sufficiently low, the direct current impedance of the circuit of the output side as viewed from the rectifier 1 can be regarded corresponding to as the load connected to the output terminal 6. The direct current does not leak between the drain and source of the FET switch 40, and thus the RF-DC conversion efficiency of the rectifying device 100 is obtained equivalent to that obtained in the case without the impedance changer 4.

Figure 7:
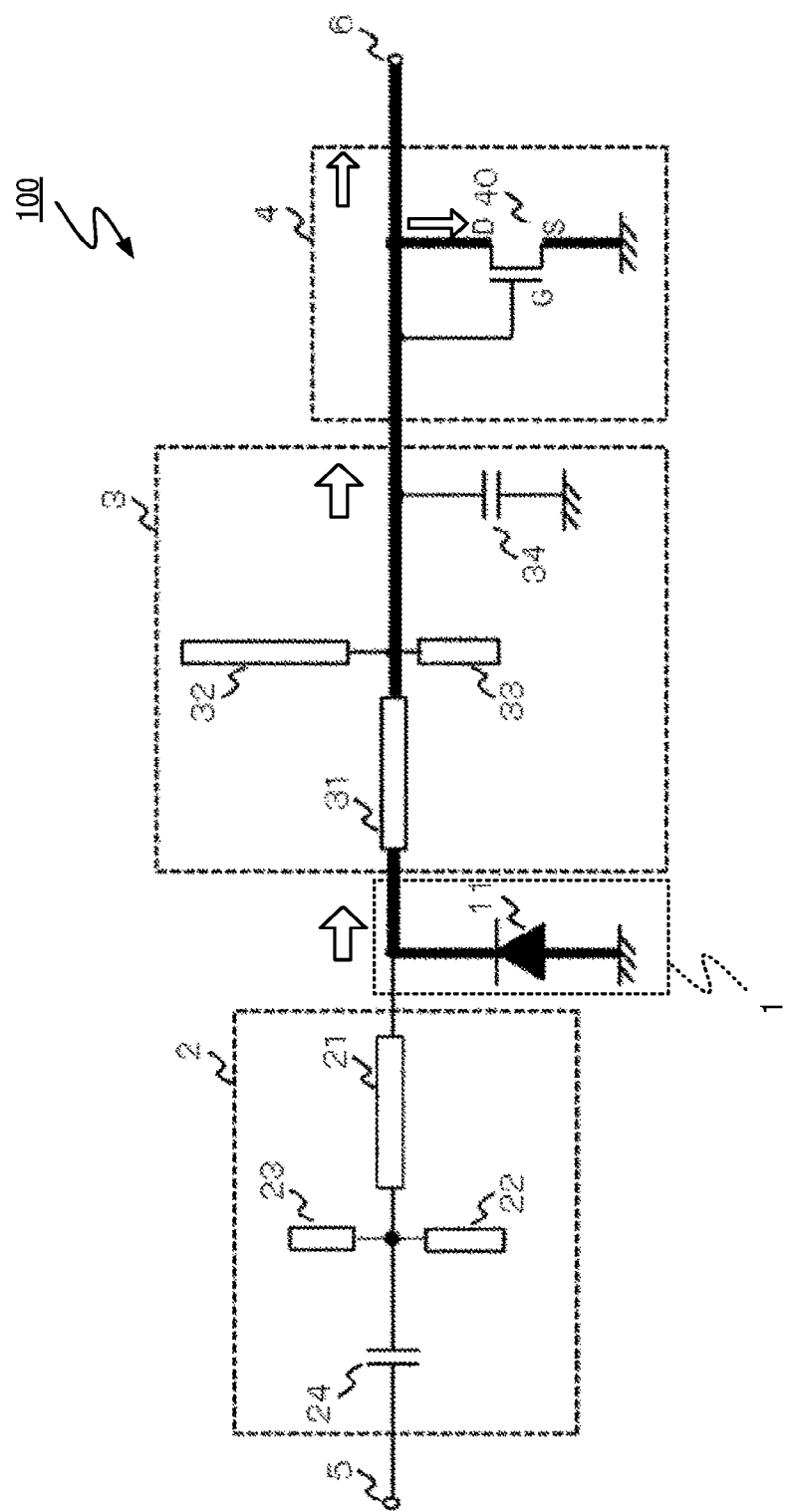
FIG. 7 is a diagram indicating a current flow in the rectifying device according to Embodiment 1.

However, as illustrated in FIG. 5, when voltage $V_{dc}>$threshold voltage $V_{FET\_th}$ is established due to input high-frequency power being high, the drain-source state of the FET switch 40 is electrically conductive, and thus the impedance of the impedance changer 4 is a value regarded as corresponding to a short circuit, for example, a value lower than 10Ω. That is, the direct current impedance of the circuit of the output side as viewed from the rectifier 1 is parallel impedance of the impedance changer 4 and the load connected to the output terminal 6. FIG. 7 indicates the flow of the direct current occurred at this time as thick solid lines. As illustrated in FIG. 7, part of the direct current leaks between the drain and the source of the FET switch 40. The direct current impedance of the circuit of the output side as viewed from the rectifier 1 is lower than that obtained in the case illustrated in FIG. 6. When the direct current impedance of the circuit of the output side as viewed from the rectifier 1 decreases, the voltage $V_{dc}$ decreases, and thus the amplitude of the high-frequency voltage applied across the rectifying element 11 is small.

When the drain-source state of the FET switch 40 is electrically conductive, the voltage $V_{dc}$ decreases. When voltage $V_{dc} \leq$ threshold value $V_{FET\_th}$ is established as a result of this decrease, the drain-source state of the FET switch 40 is electrically non-conductive. When the drain-source state of the FET switch 40 is electrically non-conductive, the direct current impedance of the circuit of the output side as viewed from the rectifier 1 is higher than that obtained in the case illustrated in FIG. 7. When the direct current impedance of the circuit of the output side as viewed from the rectifier 1 is high, the voltage $V_{dc}$ is high. When voltage $V_{dc}>$ threshold voltage $V_{FET\_th}$ is established as a result of the voltage $V_{dc}$ increase due to the drain-source state of the FET switch 40 being electrically non-conductive, the drain-source state is again electrically conductive. As described above, due to change of the electrically conductive state and the electrically non-conductive state between the drain and the source, the voltage $V_{dc}$ converges to the threshold voltage $V_{FET\_th}$. Since the threshold voltage $V_{FET\_th}$ is set to a value less than or equal to the reverse withstand voltage of the rectifying element 11, the value to which the voltage $V_{dc}$ converges is a value less than or equal to the reverse withstand voltage of the rectifying element 11. Therefore, the reverse voltage applied across the rectifying element 11 is less than or equal to the reverse withstand voltage of the rectifying element 11.

As described above, due to including of the impedance changer 4, the rectifying device 100 according to Embodiment 1 of the present disclosure enables the reverse voltage applied across the rectifying element 11 to be less than or equal to the reverse withstand voltage of the rectifying element 11. In other words, the high-frequency power to be input to the rectifying device 100 can be large.

Embodiment 2

Figure 8:
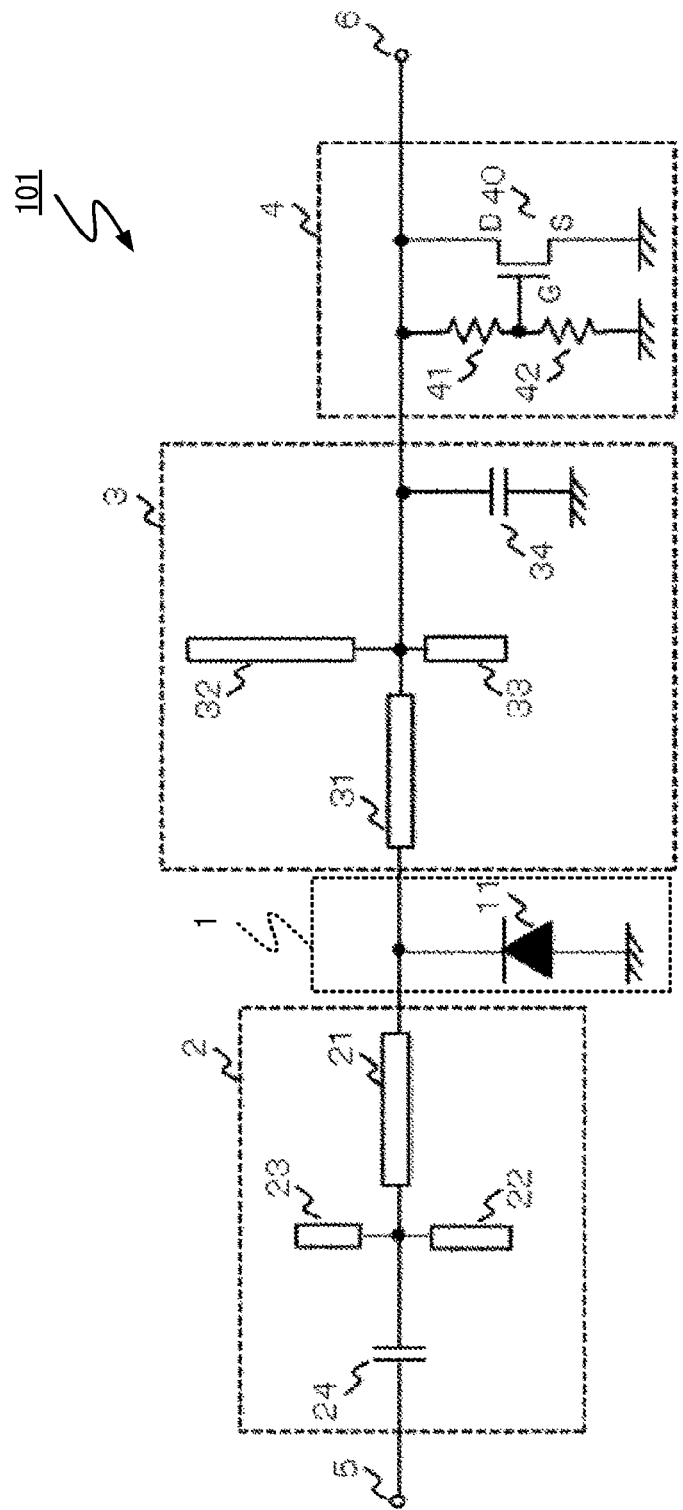
FIG. 8 is a diagram illustrating an example of a circuit configuration of a rectifying device according to Embodiment 2 of the present disclosure.

The device in which the rectifying device is installed is not limited to the rectenna apparatus 10. In addition, the circuit configuration of the rectenna apparatus 10 is not limited to the configuration thereof according to Embodiment 1. The circuit configuration of the rectifying device can be any such circuit as long as when the voltage $V_{dc}$ increases, the direct current impedance of the circuit of the output side as viewed from the rectifier 1 is low, and when the voltage $V_{dc}$ decreases, the direct current impedance of the circuit of the output side as viewed from the rectifier 1 is high. An example of a circuit is described below. The impedance changer 4 included in a rectifying device 101 illustrated in FIG. 8 further includes a voltage divider circuit having a resistor 41 and a resistor 42 in addition to the configuration of the impedance changer 4 included in the rectifying device 100.

The resistor 41 has one end connected to a connection point of the rectifier 1 and the output terminal 6, and the other end connected to the gate terminal of the FET switch 40. Specifically, the one end of the resistor 41 connects to the connection point of the output filter 3 and the output terminal 6. The resistor 42 has one end connected to the gate terminal of the FET switch 40, and the other end that is grounded.

That is, the gate terminal of the FET switch 40 connects to the output terminal 6 via the resistor 41 while a connection point of the resistor 41 and the gate terminal of the FET switch 40 is grounded via the resistor 42. Gate voltage $V_{gs}$ of the FET switch 40 is a value obtained by dividing voltage $V_{dc}$ with resistors as indicated in the equation (1).

$$V_{gs}=V_{dc}\cdot R42/(R41+R42) \qquad (1)$$

The rectifying device 101 can change gate-source voltage $V_{gs}$ of the FET switch 40 by changing resistance values of the resistor 41 and the resistor 42. Even when the threshold voltage $V_{FET\_th}$ of the FET switch 40 is unchanged, when the resistance values of the resistor 41 and the resistor 42 change, the value of the voltage $V_{dc}$ during changing of the impedance of the impedance changer 4 between an open circuit and a short circuit. That is, without changing the threshold voltage of the FET switch 40, a timing of switching an electrically conductive state and an electrically non-conductive state between the gate and the source of the FET switch 40 can be changed. As a result, there is no need to change the threshold voltage of the FET switch 40 in accordance with the reverse withstand voltage of the rectifying element 11, and consequently the suitable rectifying device 100 can be configured by changing the resistance values of the resistor 41 and the resistor 42 with respect to various rectifying elements 11. In addition, sufficiently large resistance values of the resistor 41 and the resistor 42 with respect to the load connected to the output terminal 6 can suppress power consumption by the resistor 41 and the resistor 42.

As described above, due to including of the impedance changer 4, the rectifying device 101 according to Embodiment 2 of the present disclosure enables the reverse voltage applied across the rectifying element 11 to be less than or equal to the reverse withstand voltage of the rectifying element 11. In addition, without changing of the threshold voltage of the FET switch 40, a timing of switching the electrically conductive state and the electrically non-conductive state between the gate and the source state of the FET switch 40 can be changed.

Embodiment 3

Figure 9:
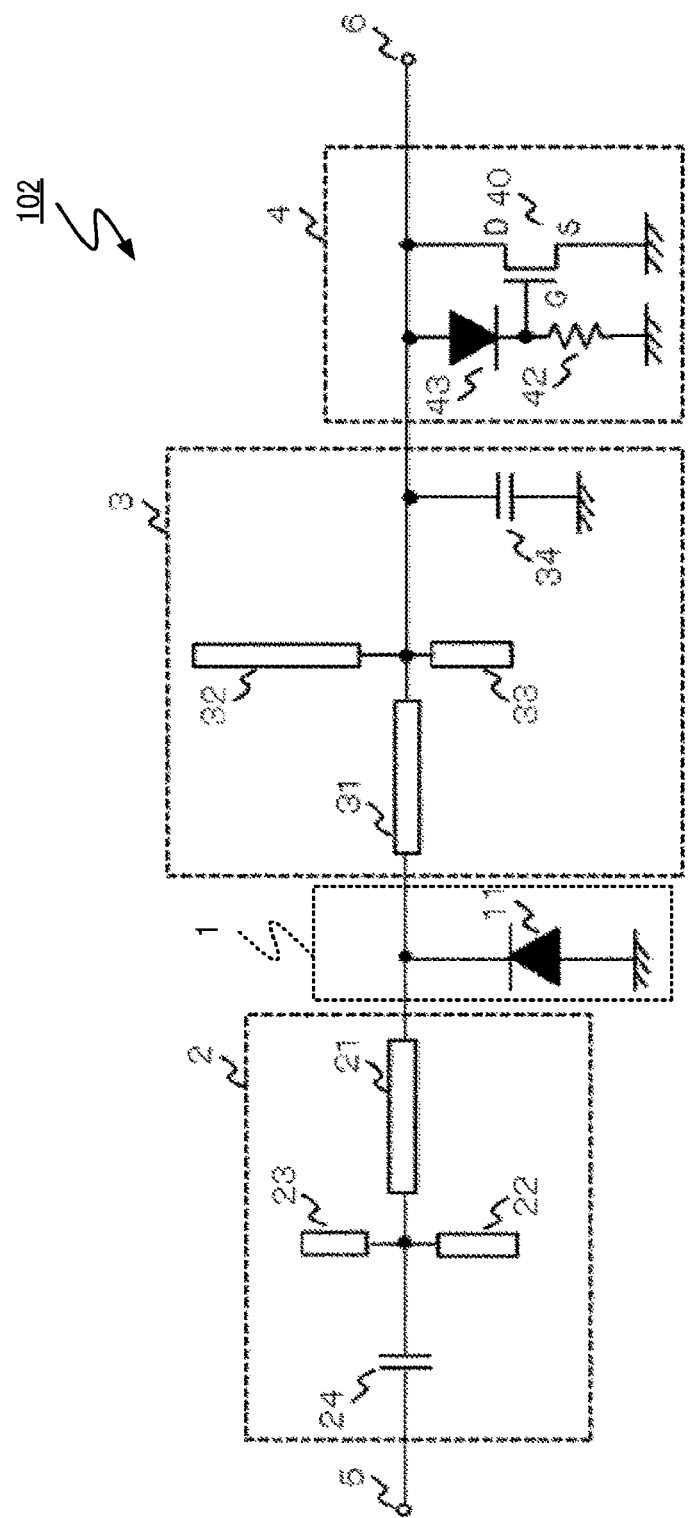
FIG. 9 is a diagram illustrating an example of a circuit configuration of a rectifying device according to Embodiment 3 of the present disclosure.

As described above, the rectifying device can be installed in any apparatus without limitation to installation in the rectenna apparatus 10. In addition, the circuit configuration of the rectifying device is not limited to that of the examples of Embodiments 1 and 2. The impedance changer 4 included in a rectifying device 102 illustrated in FIG. 9 further includes, in addition to the configuration of the impedance changer 4 included in the rectifying device 100, a pull-down circuit that applies ground voltage or negative voltage corresponding to the voltage $V_{dc}$ of the direct current power, to the control terminal of the switching element. Specifically, the impedance changer 4 included in the rectifying device 102 further includes the diode 43 and the resistor 42 included in impedance changer 4 included in the rectifying device 101 according to Embodiment 2. The diode 43 has the anode connected to the connection point of the rectifier 1 and the output terminal 6 and the cathode connected to a connection point of the resistor 42 and the gate terminal of the FET switch 40. That is, the gate terminal of the FET switch 40 connects to the output terminal 6 via the diode 43 while a connection point of the diode 43 and the gate terminal of the FET switch 40 is grounded via the resistor 42.

Figure 10:
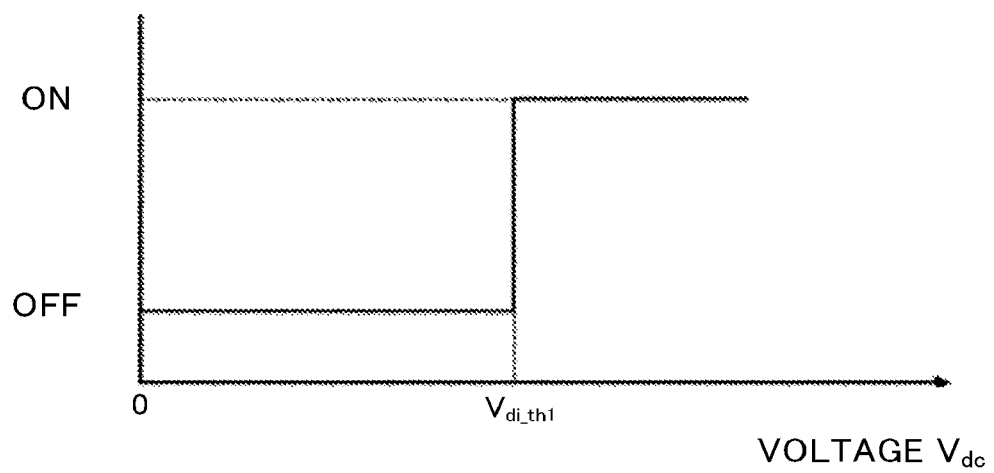
FIG. 10 is a diagram indicating a relation between voltage $V_{dc}$ and a status of a diode according to Embodiment 3.

The operation of the rectifying device 102 is described below. FIG. 10 is a diagram indicating a relation between the state of the diode 43 and the voltage $V_{dc}$. When the threshold voltage of the diode 43 of the rectifying device 102 is taken to be $V_{di\_th1}$ and when voltage $V_{dc} \leq$ threshold voltage $V_{di\_th1}$ is established, the diode 43 is turned off, and thus the impedance of the impedance changer 4 is a value regarded as corresponding to an open circuit. The diode 43 is turned on when voltage $V_{dc} >$ threshold voltage $V_{di\_th1}$ is established, and thus the impedance of the impedance changer 4 is a value regarded as corresponding to a short circuit.

Figure 11:
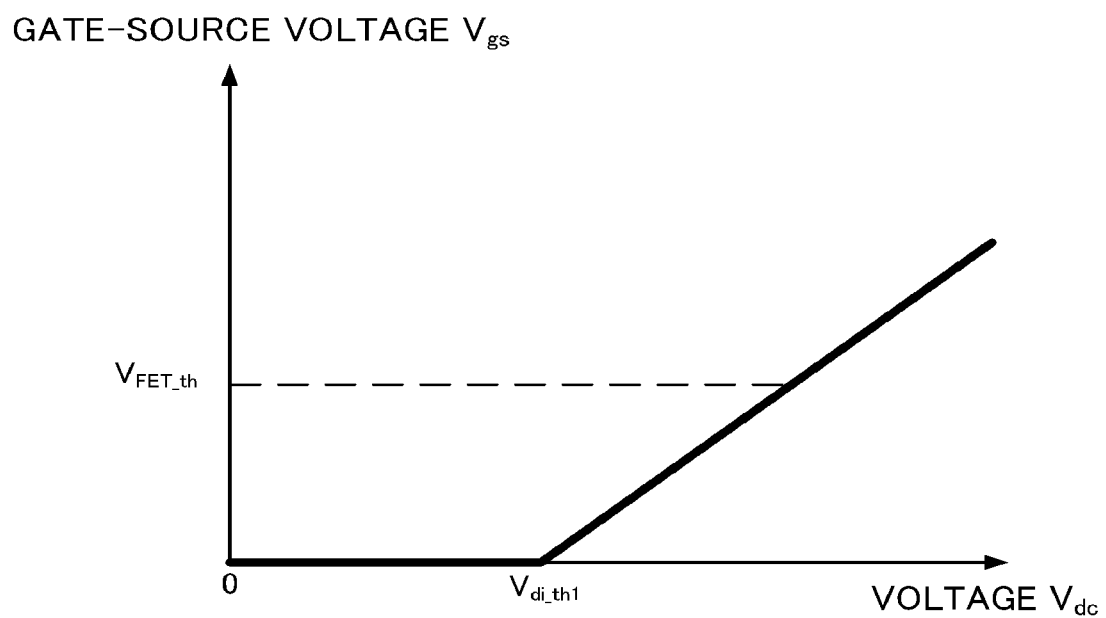
FIG. 11 is a diagram indicating a relation between gate-source voltage $V_{gs}$ of an FET switch and the voltage $V_{dc}$ in the rectifying device according to Embodiment 3.

FIG. 11 is a diagram indicating a relation between the gate-source voltage $V_{gs}$ of the FET switch 40 and the voltage $V_{dc}$. Since the voltage $V_{dc}$ is low due to low high-frequency power input to the rectifying device 102, the diode 43 is turned off when voltage $V_{dc} \leq$ threshold voltage $V_{di\_th1}$ is established. Thus, the gate-source voltage $V_{gs}$ of the FET switch 40 is pulled down via the resistor 42 to 0V. At this time, since the drain-source state of the FET switch 40 is electrically non-conductive, and thus the direct current does not leak between the drain and source, the RF-DC conversion efficiency is obtained that is equivalent to that obtained in the case without the impedance changer 4. In the rectifying device 101 according to Embodiment 2, even though the drain-source state is electrically non-conductive, positive voltage is applied between the gate and source, whereas in the rectifying device 102 according to Embodiment 3, the gate-source voltage $V_{gs}=0$ is established in the range in which voltage $V_{dc} \leq$ threshold voltage $V_{di\_th1}$ is established. Thus, the leakage of the direct current between the drain and source is further prevented than in the case of the rectifying device 102 according to Embodiment 2, and therefore a decrease in the RF-DC conversion efficiency is further prevented.

The voltage $V_{dc}$ is high because the high-frequency power input to the rectifying device 102 is high. Thus the diode 43 is turned on when voltage $V_{dc} >$ threshold voltage $V_{di\_th1}$ is established. Thus, $V_{dc}-V_{di\_th1}$ is applied to the gate terminal of the FET switch 40. When the gate-source voltage $V_{gs}$ of the FET switch 40 is less than or equal to the threshold voltage $V_{FET\_th}$ of the FET switch 40, that is, when $V_{dc}-V_{di\_th1} \leq V_{FET\_th}$ is established, the drain-source state of the FET switch 40 is electrically non-conductive, and thus the direct current does not leak between the drain and source. As a result, the RF-DC conversion efficiency of the rectifying device 100 is equivalent to that obtained in the case without the impedance changer 4 is obtained.

When the gate-source voltage $V_{gs}$ of the FET switch 40 is greater than the threshold voltage $V_{FET\_th}$ of the FET switch 40, that is, when $V_{dc}-V_{di\_th1}>V_{FET\_th}$ is established, the drain-source state of the FET switch 40 is electrically conductive. In this case, the direct current impedance of a circuit of the output side as viewed from the rectifying element 11 is the parallel impedance of the load connected to the output terminal 6 and impedance between the drain and the source of the FET switch 40. The impedance between the drain and the source of the FET switch 40 is a value lower than 10Ω. When the direct current impedance of the circuit of the output side as viewed from the rectifier 1 is low, the amplitude of the high-frequency voltage applied across the rectifying element 11 and the voltage $V_{dc}$ decrease. Similarly to Embodiment 1, the voltage $V_{dc}$ converges to $V_{FET\_th}+V_{di\_th1}$ by switching the electrically conductive state and the electrically non-conductive state between the drain and the source. The $V_{FET\_th}$ and $V_{di\_th1}$ are set so that $V_{FET\_th}+V_{di\_th1}$ is a value less than or equal to the reverse withstand voltage of the rectifying element 11.

Figure 12:
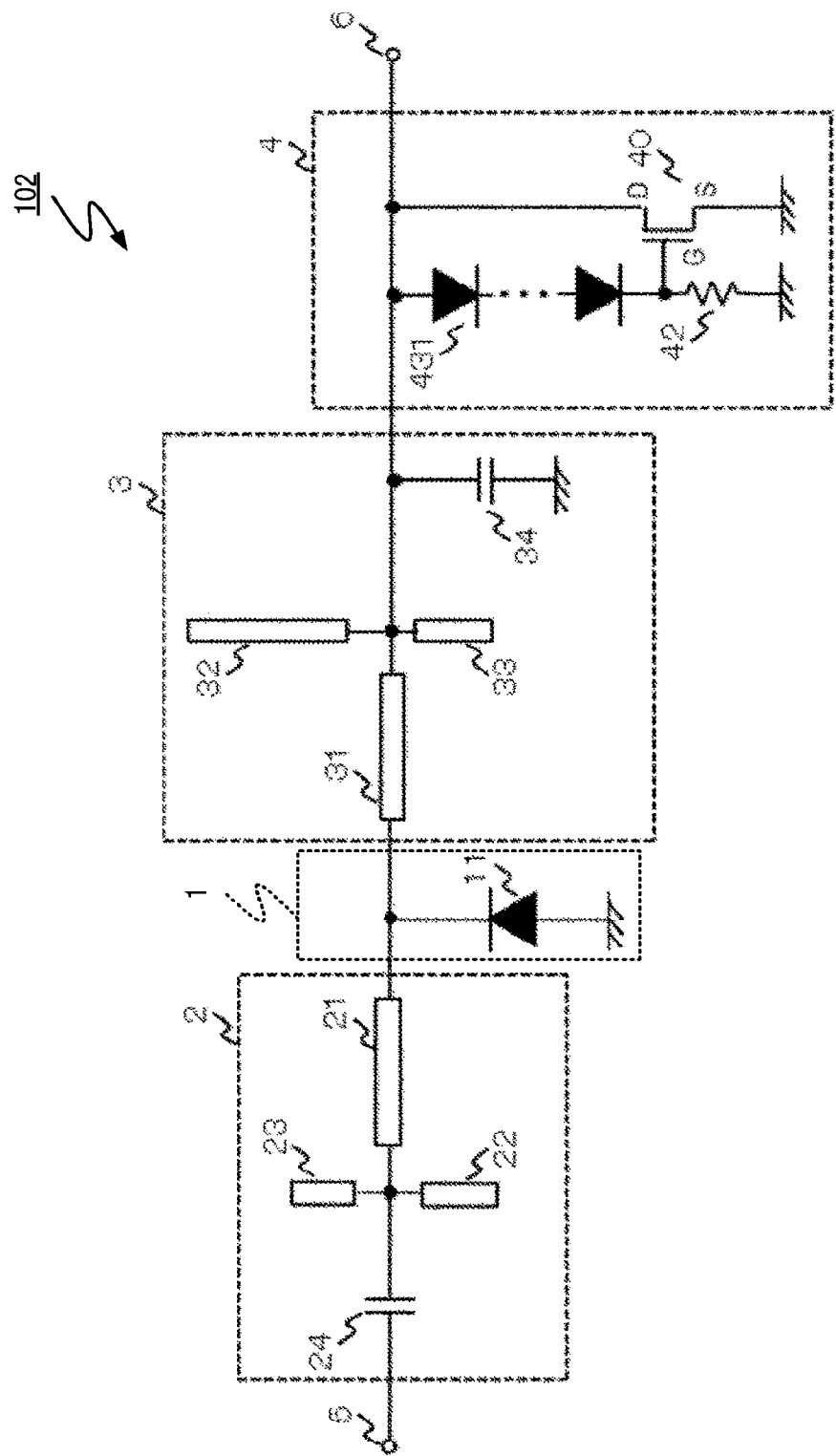
FIG. 12 is a block diagram illustrating a configuration of a modified example of the rectifying device according to Embodiment 3.

As illustrated in FIG. 12, the rectifying device 102 may include, instead of the diode 43, at least one diode 431 connected in series. The forward direction of the at least one diode 431 connected in series is a direction from one end connected to the connection point of the rectifier 1 and the output terminal 6 towards the other end connected to the gate terminal of the FET switch 40. The sum of threshold voltage of the diode 431 corresponds to the threshold voltage $V_{di\_th1}$ of the diode 43 illustrated in FIG. 11. Therefore, a change in the number of the diodes 431 can vary the threshold voltage $V_{di\_th1}$.

As described above, according to the rectifying device 102 of the present Embodiment 3, the inclusion of the impedance changer 4 enables the reverse voltage applied across the rectifying element 11 to be less than or equal to the reverse withstand voltage of the rectifying element 11. In addition, since the gate-source voltage $V_{gs}=0$ is established in the range in which voltage $V_{dc} \leq$ threshold voltage $V_{di\_th1}$ is established, a decrease in the RF-DC conversion efficiency of the rectifying device 102 is prevented.

Embodiment 4

Figure 13:
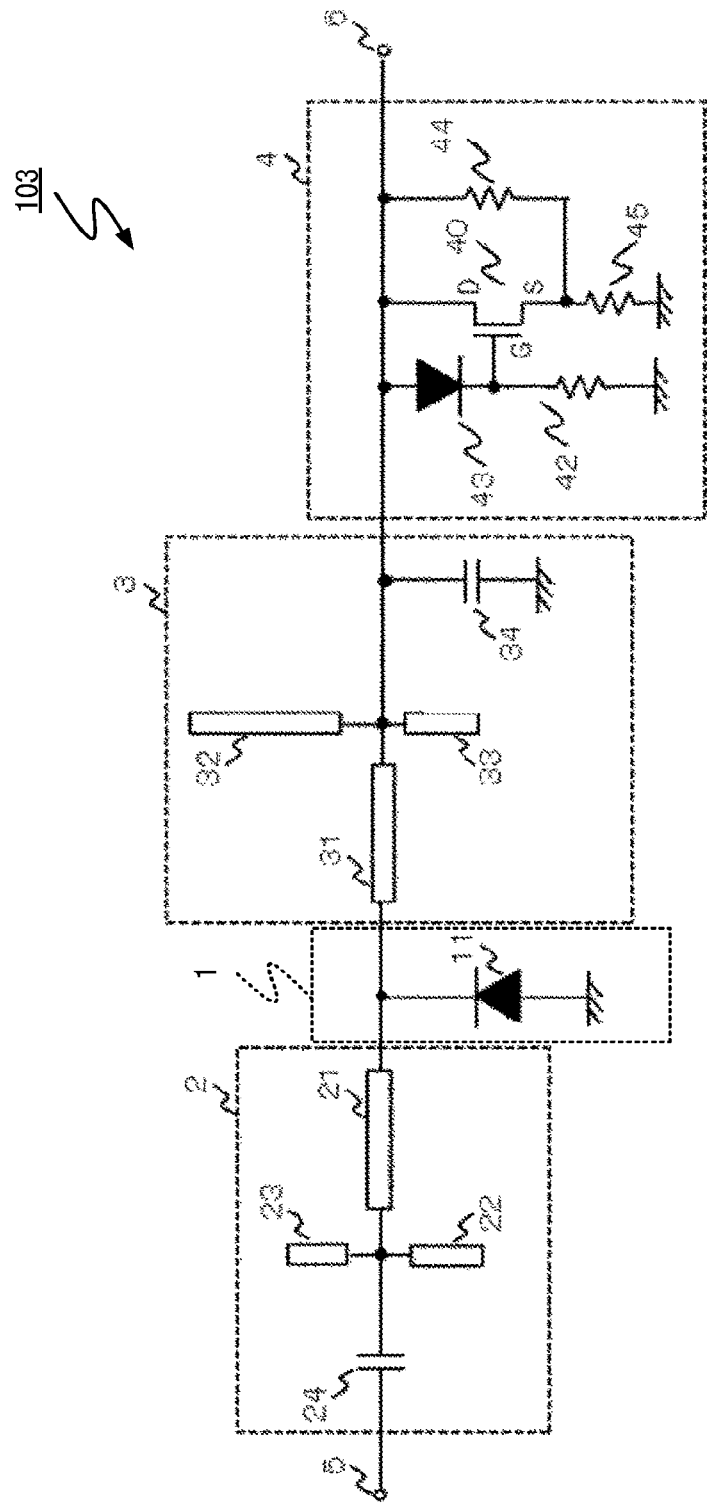
FIG. 13 is a diagram illustrating an example of a circuit configuration of a rectifying device according to Embodiment 4 of the present disclosure.

As described above, the rectifying device can be installed in any apparatus without limitation to installation in the rectenna apparatus 10. In addition, the circuit configuration of the rectifying device is not limited to that of the examples of the Embodiments 1 to 3. The pull-down circuit is any such circuit as long as the circuit applies the ground voltage or the negative voltage corresponding to the voltage $V_{dc}$ to the control terminal of the switching element included in the impedance changer 4. The impedance changer 4 included in a rectifying device 103 according to Embodiment 4 and illustrated in FIG. 13 further includes a resistor 44 and a resistor 45, in addition to the configuration of the impedance changer 4 included in the rectifying device 102 illustrated in FIG. 9. The pull-down circuit includes the resistors 42, 44, 45 and the diode 43.

The resistor 44 has one end connected to the connection point of the output filter 3 and the output terminal 6. The resistor 44 has the other end connected to the source terminal of the FET switch 40. That is, since the source terminal connects to the output terminal 6 via the resistor 44, the resistor 44 is connected in parallel between the drain terminal and the source terminal that are included in the FET switch 40. The resistor 45 has one end that is grounded and the other end connected to the source terminal of the FET switch 40. That is, a connection point of the resistor 44 and the source terminal of the FET switch 40 is grounded via the resistor 45.

Figure 14:
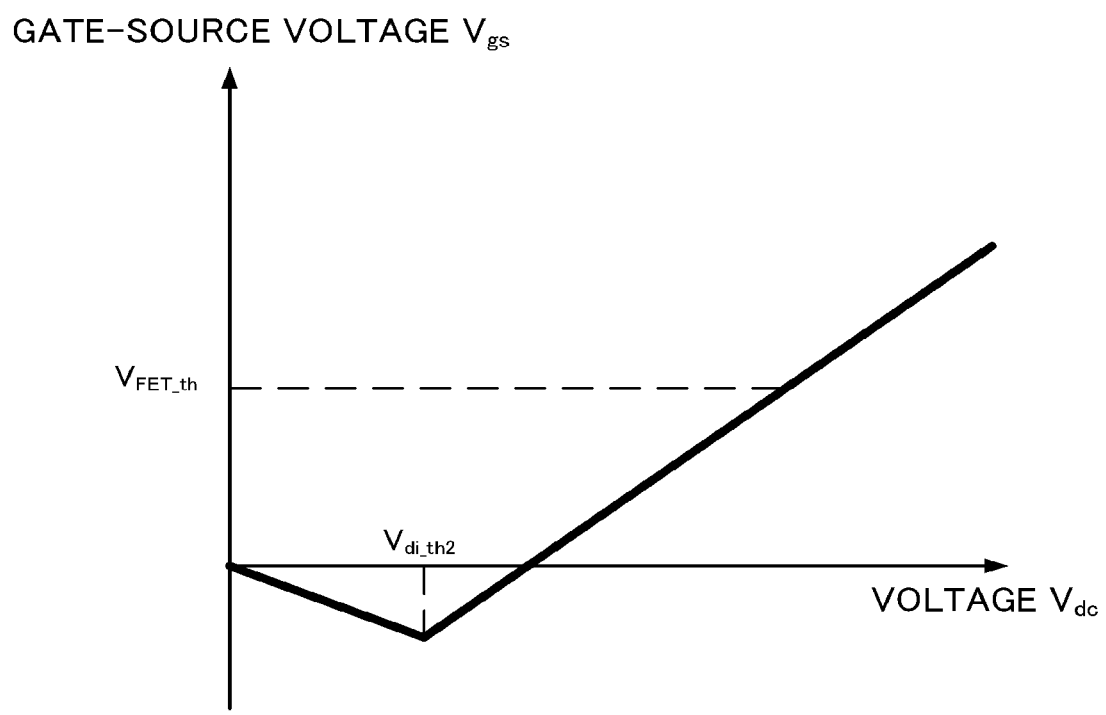
FIG. 14 is a diagram indicating a relation of the rectifying device according to Embodiment 4 between gate-source voltage $V_{gs}$ of an FET switch and voltage $V_{dc}$.

The operation of the rectifying device 103 is described below. FIG. 14 indicates a relation between gate-source voltage $V_{gs}$ of the FET switch 40 and voltage $V_{dc}$. $V_{di\_th2}$ illustrated in FIG. 14 is threshold voltage of the diode 43 of the rectifying device 103. In the rectifying device 103, the gate-source voltage $V_{gs}$ of the FET switch 40 is a negative value in the range in which voltage $V_{dc} \leq V_{di\_th2} \cdot \{(R44+R45)/R44\}$ is established. Note that, in the above equation, R44 indicates the resistance value of the resistor 44, while R45 indicates the resistance value of the resistor 45.

When the threshold voltage of the diode 43 of the rectifying device 103 is taken to be $V_{di\_th2}$ and when voltage $V_{dc} \leq$ threshold voltage $V_{di\_th2}$ is established, the diode 43 is turned off when voltage $V_{dc} \leq$ threshold voltage $V_{di\_th2}$ is established. At this time, the gate-source voltage $V_{gs}$ of the FET switch 40 is $V_{gs}=-V_{dc} \cdot R45/(R44+R45)$, that is, a negative value. Since the drain-source state of the FET switch 40 is electrically non-conductive, the direct current power does not leak between the drain and the source. As a result, the RF-DC conversion efficiency of the rectifying device 100 is obtained that is equivalent to that obtained in the case without the impedance changer 4.

When voltage $V_{dc}$>threshold voltage $V_{di\_th2}$ is established, the diode 43 is turned on. At this time, the gate-source voltage of the FET switch 40 is $V_{gs}=\{V_{dc}\cdot R44/(R44+R45)\}-V_{di\_th2}$. When the gate-source voltage $V_{gs}$ of the FET switch 40 is less than or equal to the threshold voltage $V_{FET\_th}$ of the FET switch 40, that is, when $\{V_{dc}\cdot R44/(R44+R45)\}-V_{di\_th2} \leq V_{FET\_th}$ is established, the drain-source state of the FET switch 40 is electrically non-conductive. Thus, the direct current does not leak between the drain and source, and thus the RF-DC conversion efficiency is obtained that is equivalent to that obtained in the case without the impedance changer 4.

When the gate-source voltage $V_{gs}$ of the FET switch 40 is greater than the threshold voltage $V_{FET\_th}$ of the FET switch 40, that is, when $\{V_{dc}\cdot R44/(R44+R45)\}-V_{di\_th2}>V_{FET\_th}$ is established, the drain-source state of the FET switch 40 is electrically conductive. In this case, the direct current impedance of the circuit of the output side as viewed from the rectifying element 11 is the parallel impedance of the load connected to the output terminal 6 and the impedance between the drain and the source of the FET switch 40. When the direct current impedance of the circuit of the output side as viewed from the rectifier 1 is low, the amplitude of the high-frequency voltage applied across the rectifying element 11 and $V_{dc}$ decreases. Similarly to Embodiments 1 to 3, the voltage $V_{dc}$ converges to $(V_{di\_th2}+V_{FET\_th})\cdot(R44+R45)/R44$ by switching the electrically conductive state and the electrically non-conductive state between the drain and the source. Values of $V_{di\_th2}$, $V_{FET\_th}$, R44 and R45 are set so that $(V_{di\_th2}+V_{FET\_th})\cdot(R44+R45)/R44$ is a value less than or equal to the reverse withstand voltage of the rectifying element 11.

Figure 15:
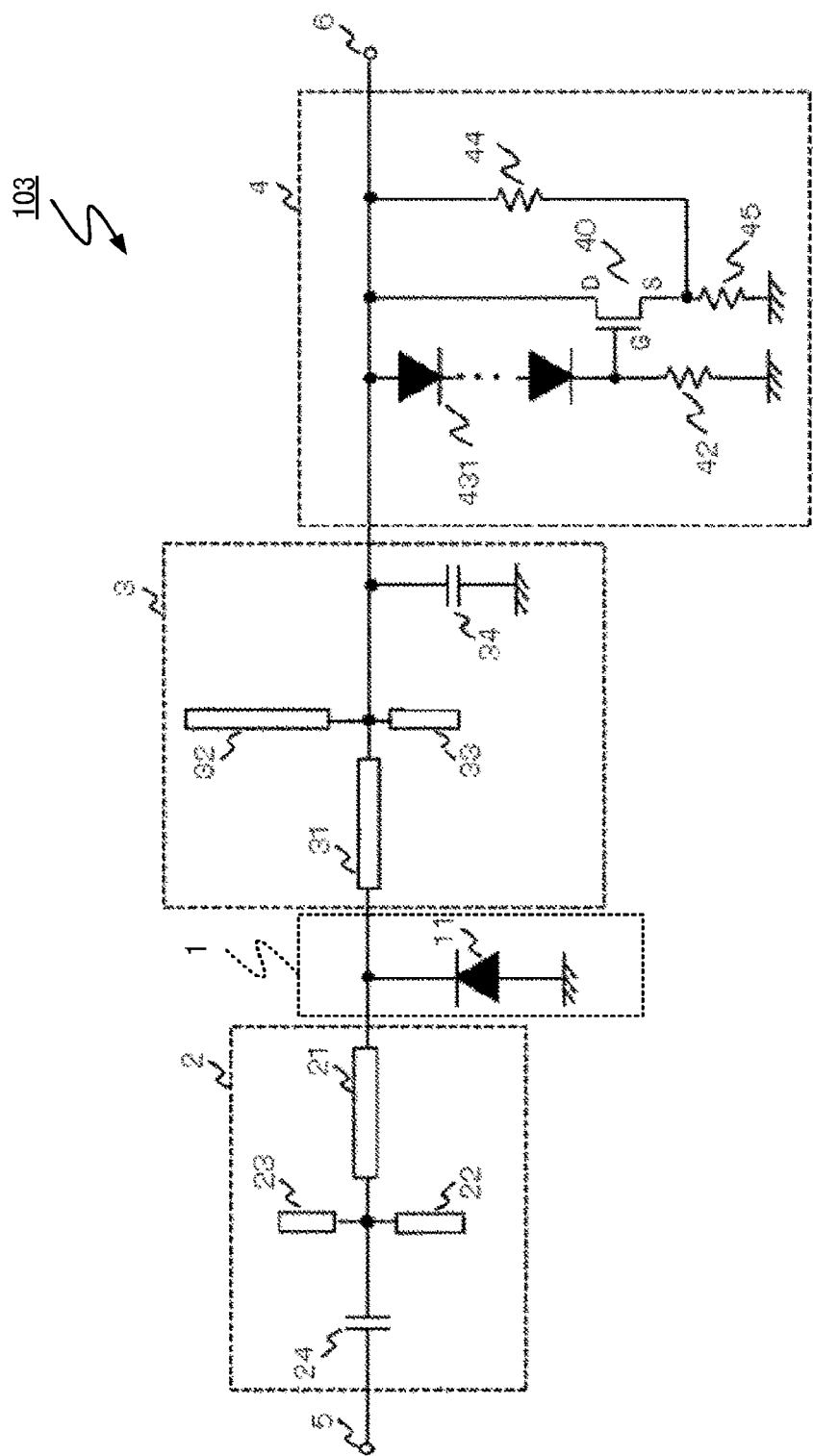
FIG. 15 is a diagram illustrating a modified example of the circuit configuration of the rectifying device according to Embodiment 4.

As illustrated in FIG. 15, the rectifying device 103 may include, instead of the diode 43, the at least one diode 431 connected in series. The forward direction of the at least one diode 431 connected in series is a direction from one end connected to the connection point of the output filter 3 and the output terminal 6 towards the other end connected to the gate terminal of the FET switch 40. The sum of the threshold voltage of the diode 431 corresponds to the threshold voltage $V_{di\_th2}$ of the diode 43 illustrated in FIG. 13. Therefore, a change in the number of the diodes 431 can vary the threshold voltage $V_{di\_th2}$.

As described above, according to the rectifying device 103 of the present Embodiment 4, the inclusion of the impedance changer 4 enables the reverse voltage applied across the rectifying element 11 to be less than or equal to the reverse withstand voltage of the rectifying element 11. In addition, since the gate-source voltage $V_{gs}$ of the FET switch 40 is negative voltage in the range in which voltage $V_{dc} \leq V_{di\_th2} \cdot \{(R44+R45)/R44\}$ is established, a decrease in the RF-DC conversion efficiency of the rectifying device 103 is prevented.

Embodiment 5

Figure 16:
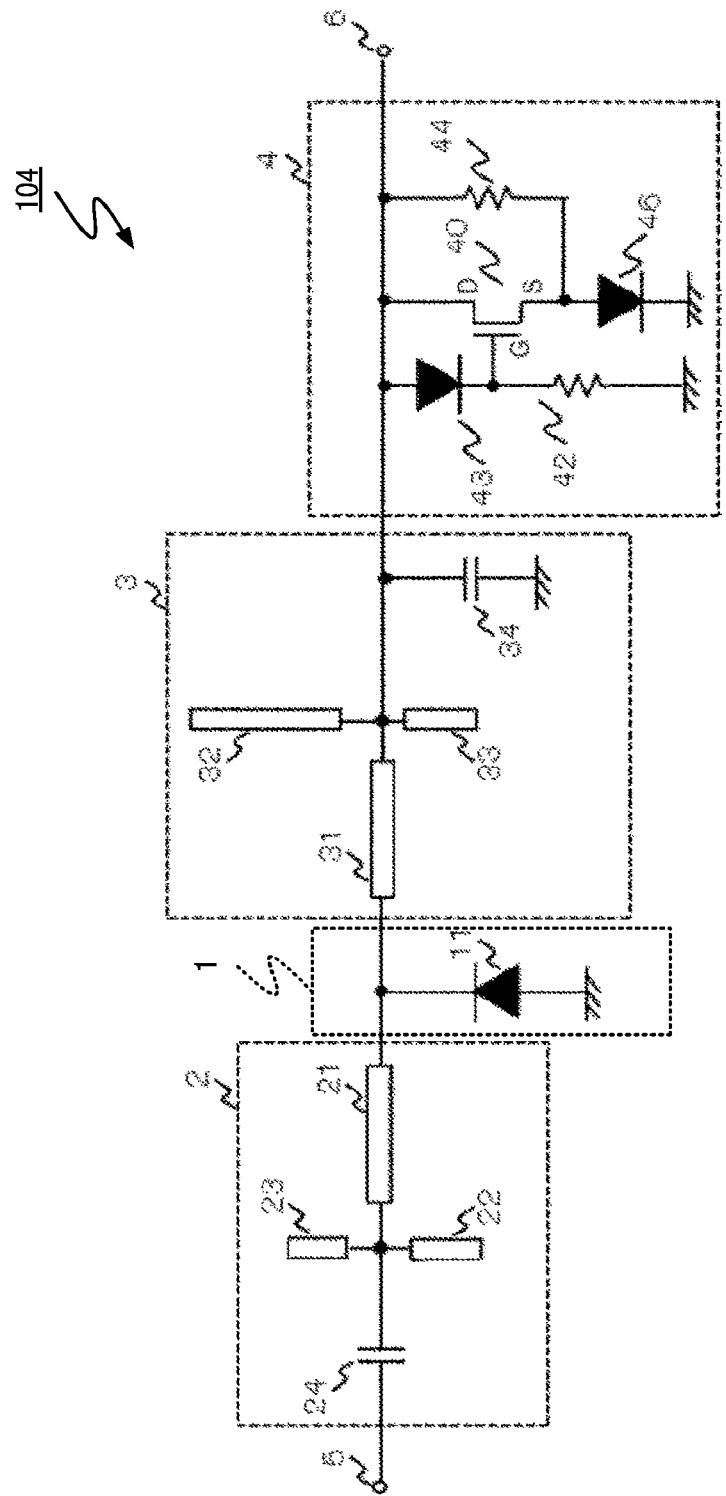
FIG. 16 is a diagram illustrating an example of a circuit configuration of a rectifying device according to Embodiment 5 of the present disclosure.

As described above, the rectifying device can be installed in any apparatus without limitation to installation in the rectenna apparatus 10. In addition, the circuit configuration of the rectifying device is not limited to that of the examples of Embodiments 1 to 4. The pull-down circuit is any circuit as long as the circuit applies the ground voltage or the negative voltage corresponding to the voltage $V_{dc}$ to the control terminal of the switching element included in the impedance changer 4. The impedance changer 4 included in a rectifying device 104 according to Embodiment 5 and illustrated in FIG. 16 includes a diode 46 instead of the resistor 45 included in the impedance changer 4 included in the rectifying device 103 illustrated in FIG. 15. The diode 46 has the cathode that is grounded and the anode connected to the source terminal of the FET switch 40. That is, the source terminal connects to the output terminal 6 via the resistor 44 while the connection point of the resistor 44 and the source terminal of the FET switch 40 is grounded via the diode 46.

The operation of the rectifying device 104 is described below. The threshold voltage of the diode 46 of the rectifying device 104 is taken to be $V_{di\_th3}$. Note that the threshold voltage $V_{di\_th3}$ of the diode 46 is taken to be lower than the threshold voltage $V_{di\_th2}$ of the diode 43. That is, $V_{di\_th3}<V_{di\_th2}$ is established. When voltage $V_{dc} \leq$ threshold voltage $V_{di\_th3}$ is established, the diode 46 is turned off, and the direct current impedance of the impedance changer 4 is a value regarded as corresponding to an open circuit. When voltage $V_{dc} \geq$ threshold voltage $V_{di\_th3}$ is established, the diode 46 is turned on, and the direct current impedance of the impedance changer 4 is a value regarded as corresponding to a short circuit.

The gate-source voltage $V_{gs}$ of the FET switch 40 included in the rectifying device 104 is a negative value as seen from $V_{dc} \leq V_{di\_th3}$, and $V_{gs}=-V_{dc}$, when the diode 46 and diode 43 are turned off. When the diode 46 is turned on, and the diode 43 is turned off, that is, when $V_{di\_th3}<V_{dc} \leq V_{di\_th2}$ is established, the gate-source voltage $V_{gs}$ is a negative value as seen from the gate-source voltage $V_{gs}=-V_{di\_th3}$. When the diode 46 and the diode 43 are turned on, that is, when $V_{dc} \geq V_{di\_th2}$ is established, the gate-source voltage $V_{gs}=V_{dc}-(V_{di\_th2}+V_{di\_th3})$ is established.

Similarly to the rectifying device 103, since the gate-source voltage $V_{gs}$ of the FET switch 40 is a negative value in the range in which voltage $V_{dc}<$gate-source voltage $V_{di\_th2}$ is established, the rectifying device 104 further reduces the amount of the direct current to be leaked between the drain and the source, thereby enabling prevention of a decrease in the RF-DC conversion efficiency.

Furthermore, the gate-source voltage $V_{gs}$ of the FET switch 40 of the rectifying device 104 is $V_{gs}=-V_{dc}$ in the range in which voltage $V_{dc} \leq$ threshold voltage $V_{di\_th3}$ is established. And thus, the gate-source voltage $V_{gs}$ of the FET switch 40 of the rectifying device 104 is lower than the gate-source voltage $V_{gs}=-V_{dc}\cdot R45/(R44+R45)$ of the rectifying device 103. As a result, the amount of direct current to be leaked between the drain and the source can be decreased further than that of the rectifying device 103, and thereby enabling prevention of a decrease in the RF-DC conversion efficiency.

Figure 17:
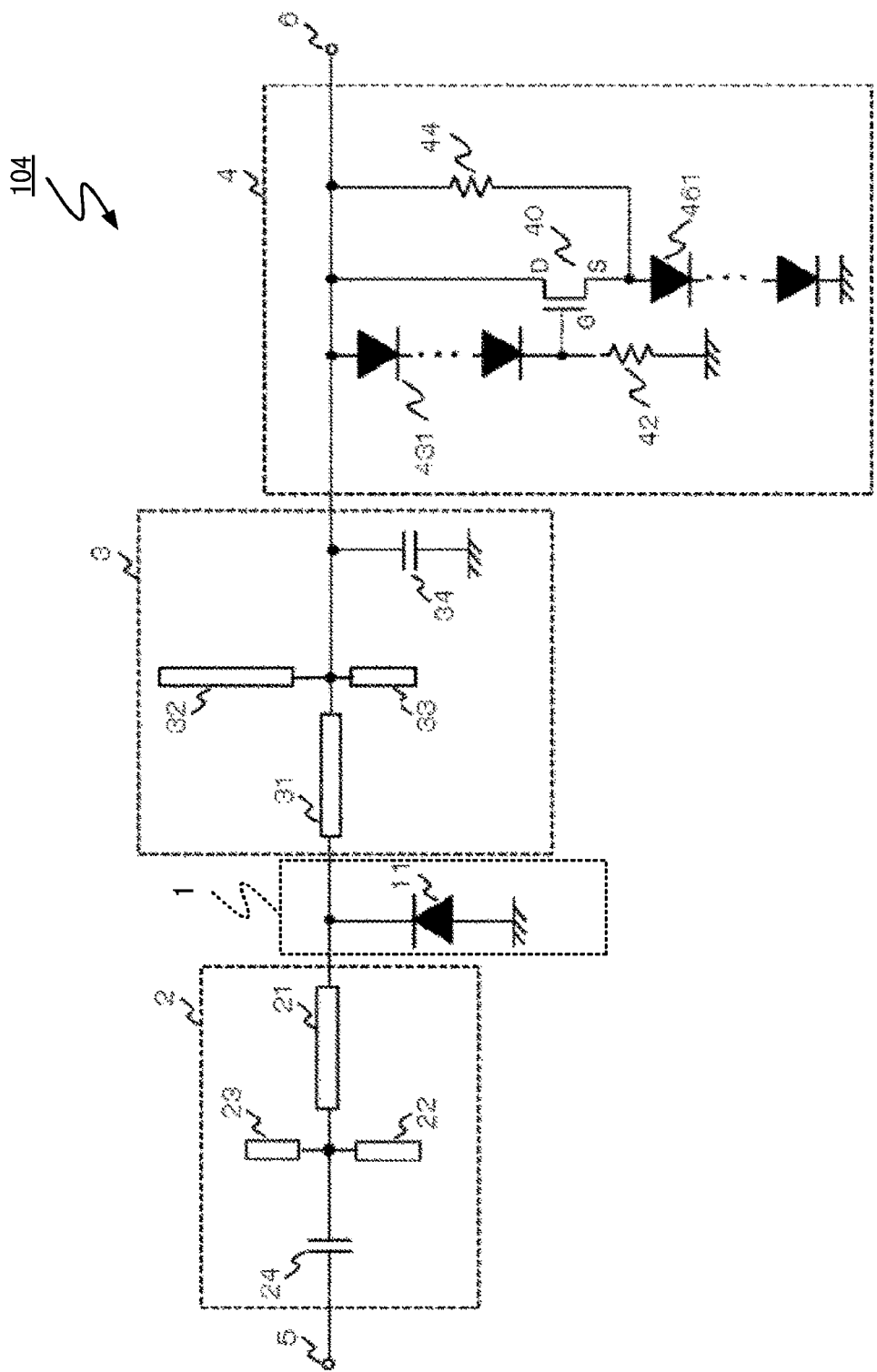
FIG. 17 is a diagram illustrating a modified example of the circuit configuration of the rectifying device according to Embodiment 5.

As illustrated in FIG. 17, the rectifying device 104 may include, instead of the diode 43, the at least one diode 431 connected in series. The forward direction of the at least one diode 431 connected in series is a direction from one end connected to the connection point of the output filter 3 and the output terminal 6 towards the other end connected to the gate terminal of the FET switch 40. The sum of the threshold voltage of the diode 431 corresponds to the threshold voltage $V_{di\_th2}$ of the diode 43 illustrated in FIG. 16. Therefore, a change in the number of the diodes 431 can vary the threshold voltage $V_{di\_th2}$. In addition, the rectifying device 104 may include at least one diode 461 connected in series, instead of the diode 46. The forward direction of the at least one diode 461 connected in series is a direction from one end connected to the source terminal of the FET switch 40 towards the other end that is grounded. The sum of threshold voltage of the diode 461 corresponds to the threshold voltage $V_{di\_th3}$ of the diode 46 illustrated in FIG. 16. Therefore, a change in the number of the diodes 461 can vary the threshold voltage $V_{di\_th2}$.

As described above, according to the rectifying device 104 of the present Embodiment 5, the inclusion of the impedance changer 4 enables the reverse voltage applied across the rectifying element 11 to be less than or equal to the reverse withstand voltage of the rectifying element 11. In addition, since in the range in which voltage $V_{dc}$≤threshold voltage $V_{di\_th3}$ is established, the gate-source voltage $V_{gs}$ of the FET switch 40 of the rectifying device 104 is $V_{gs}=-V_{dc}$, and a decrease in RF-DC conversion efficiency of the rectifying device 104 is prevented.

Embodiment 6

Figure 18:
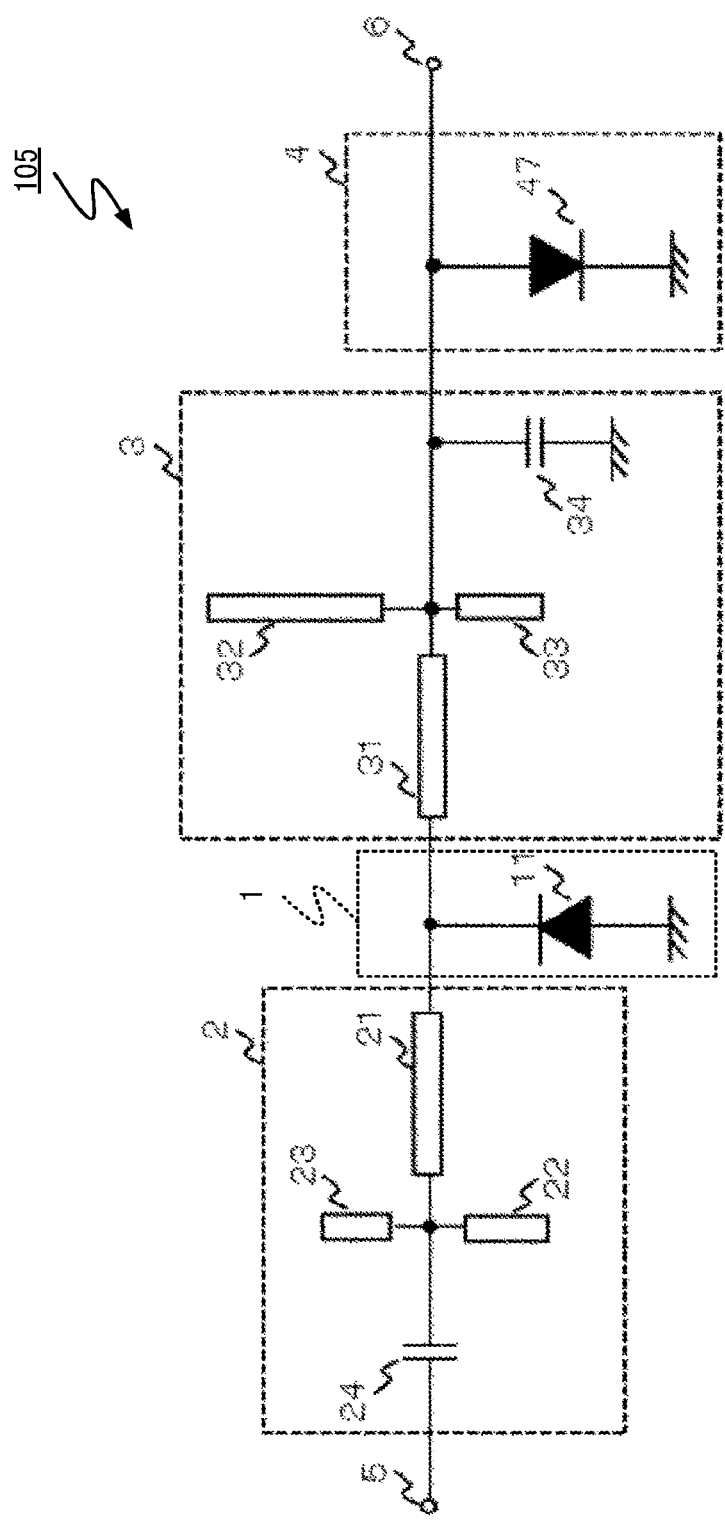
FIG. 18 is a diagram illustrating an example of a circuit configuration of a rectifying device according to Embodiment 6 of the present disclosure.

As described above, the rectifying device can be installed in any apparatus without limitation to installation in the rectenna apparatus 10. In addition, the circuit configuration of the rectifying device is not limited to that of the examples of Embodiments 1 to 5. The impedance changer 4 included in a rectifying device 105 according to Embodiment 6 and illustrated in FIG. 18 includes a diode 47. The diode 47 is oriented in accordance with the polarity of the direct current power. Because the voltage of the direct current power is positive, the rectifying device 105 has the anode of the diode 47 connected to the connection point of the output filter 3 and the output terminal 6, and the cathode that is grounded.

Operation of the rectifying device 105 is described below. When threshold voltage of the diode 47 of the rectifying device 105 is taken to be $V_{di\_th4}$, and when voltage $V_{dc}$≤threshold voltage $V_{di\_th4}$ is established, the diode 47 is turned off and the direct current impedance of the impedance changer 4 is a value regarded as corresponding to an open circuit. In this case, the direct current does not leak to the impedance changer 4, and thus the RF-DC conversion efficiency is obtained equivalent to that obtained in the case without the impedance changer 4. The diode 47 is turned on when voltage $V_{dc}$ threshold voltage $V_{di\_th4}$ is established and thus the direct current impedance of the impedance changer 4 is a value regarded as corresponding to a short circuit, that is, for example, a value lower than 10Ω. At this time, part of the direct current leaks to the impedance changer 4. The direct current impedance of the circuit of the output side as viewed from the rectifier 1 is lower than that obtained in the case in which the diode 47 is turned off. When the direct current impedance of the circuit of the output side as viewed from the rectifier 1 is low, the voltage $V_{dc}$ decreases, and thus the amplitude of the high-frequency voltage applied across the rectifying element 11 decreases.

When the diode 47 is turned on, the voltage $V_{dc}$ decreases. As a result, when voltage $V_{dc}$≤threshold voltage $V_{di\_th4}$ is established, the diode 47 is turned off. When the diode 47 is turned off, the direct current impedance of the circuit of the output side as viewed from the rectifier 1 is greater than that obtained in the case in which the diode 47 is turned on, and thus the voltage $V_{dc}$ is high. When voltage $V_{dc}$>threshold voltage $V_{di\_th4}$ is established due to an increase in voltage $V_{dc}$, the diode 47 is turned on as described above. The voltage $V_{dc}$ converges to the threshold voltage $V_{di\_th4}$ due to repeated turning on and off of the diode 47. The threshold voltage $V_{di\_th4}$ is set to be a value less than or equal to the reverse withstand voltage of the rectifying element 11. As a result, the reverse voltage applied across the rectifying element 11 is less than or equal to the reverse withstand voltage of the rectifying element 11.

Figure 19:
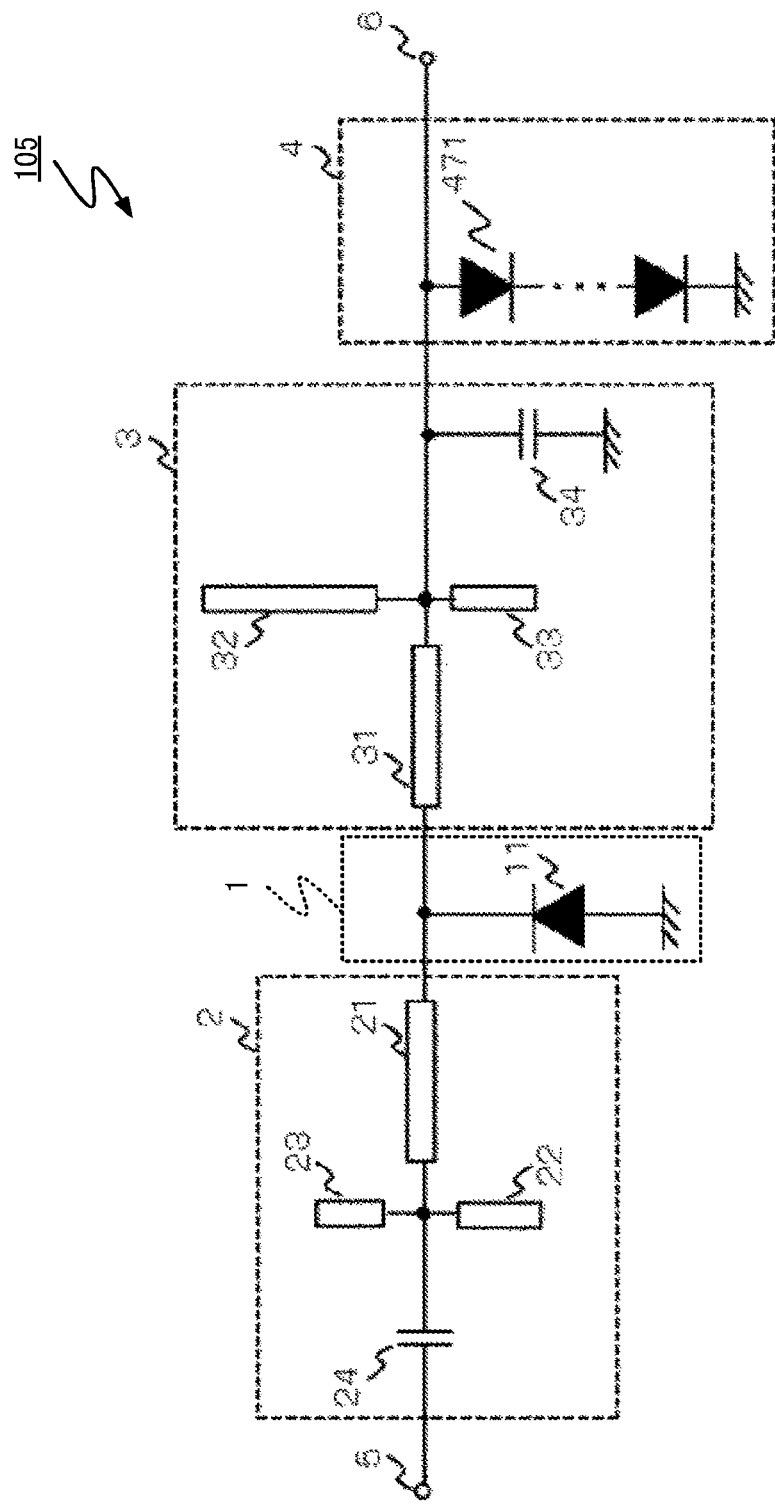
FIG. 19 is a diagram illustrating a first modified example of the circuit configuration of the rectifying device according to Embodiment 6.

As illustrated in FIG. 19, the rectifying device 105 may include, instead of the diode 47, at least one diode 471 connected in series. The forward direction of the at least one diode 471 connected in series is a direction from one end connected to the connection point of the output filter 3 and the output terminal 6 towards the other end that is grounded. The sum of threshold voltage of the diode 471 corresponds to the threshold voltage $V_{di\_th4}$ illustrated in FIG. 18. Therefore, a change in the number of the diode 471 can vary the threshold voltage $V_{di\_th3}$.

Figure 20:
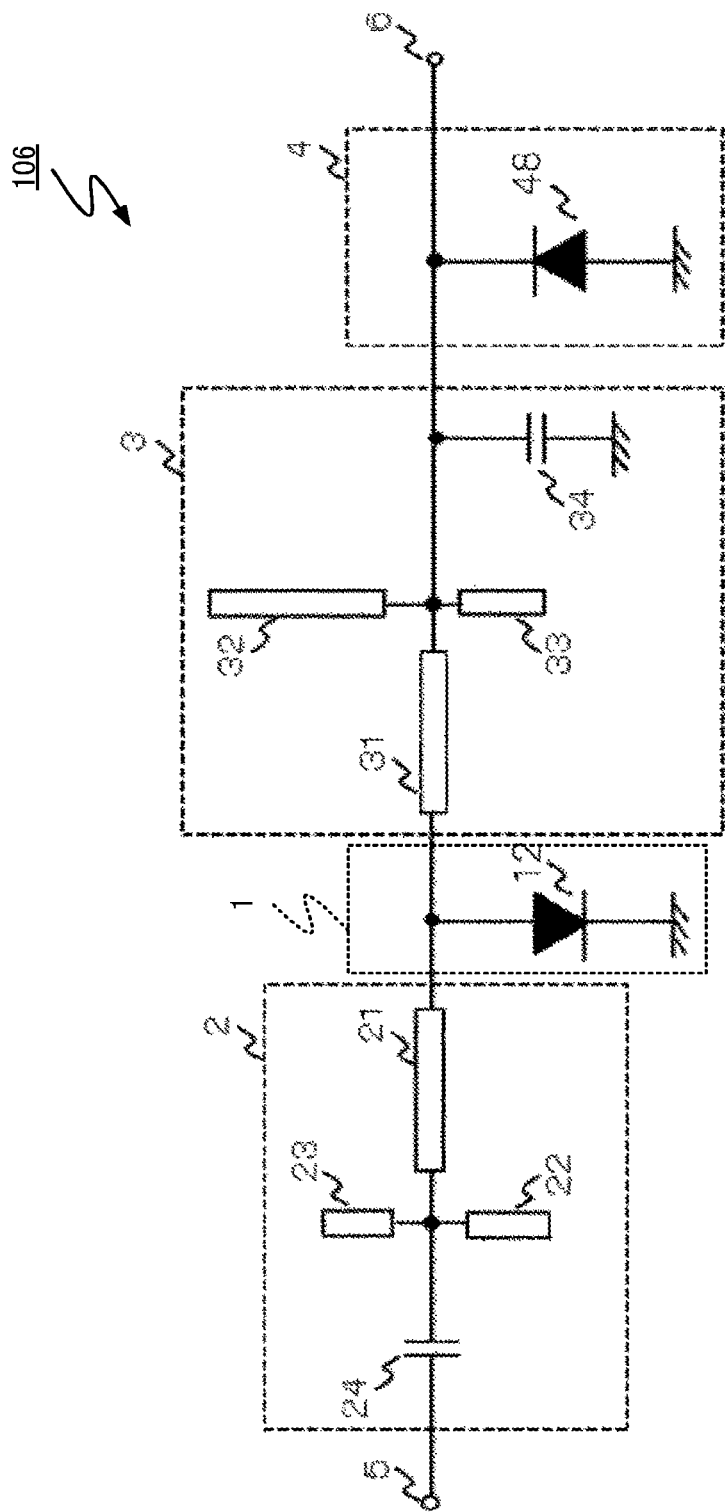
FIG. 20 is a diagram illustrating a second modified example of the circuit configuration of the rectifying device according to Embodiment 6.

A rectifying device 106 illustrated in FIG. 20 differs from the rectifying device 105 in polarity of the direct current voltage output by the rectifier 1. The rectifier 1 includes a rectifying element 12 that includes a diode. The rectifying element 12 is oriented so that negative direct current voltage is output by the rectifier 1. That is, the rectifying element 12 has the anode connected to the output end of the input filter 2 and the input end of the output filter 3, and the cathode of the rectifying element 12 that is grounded. The impedance changer 4 has a diode 48. The diode 48 has the anode that is grounded and the cathode connected to the connection point of the rectifier 1 and the output terminal 6. Specifically, the cathode of the diode 48 connects to the connection point of the output filter 3 and the output terminal 6.

The operation of the rectifying device 106 is described below. Upon input of high-frequency power to the rectifying device 106, the rectifying device 106 outputs voltage $V_{dc}$ that is negative voltage from the output terminal. Absolute value $|V_{dc}|$ of voltage that is negative voltage increases as the high-frequency power increases.

In the case in which the absolute value of the voltage $V_{dc}$ is less than or equal to the threshold voltage of the diode 48, the diode 48 is turned off, and thus the impedance of the impedance changer 4 is regarded as corresponding to an open circuit. When the absolute value of voltage $V_{dc}$ is greater than the threshold voltage of the diode 48, the diode 48 is turned on, so that the impedance of the impedance changer 4 can be a value regarded as corresponding to a short-circuit, for example, a value lower than 10Ω. Similarly to the rectifying device 105, the absolute value of the voltage $V_{dc}$ converges to the threshold voltage of the diode 48 due to repeated turning on and off of the diode 48. The threshold voltage of the diode 48 is set such that the threshold voltage is less than or equal to the reverse withstand voltage of the rectifying element 11. As a result, the reverse voltage applied across the rectifying element 11 is less than or equal to the reverse withstand voltage of the rectifying element 11.

Figure 21:
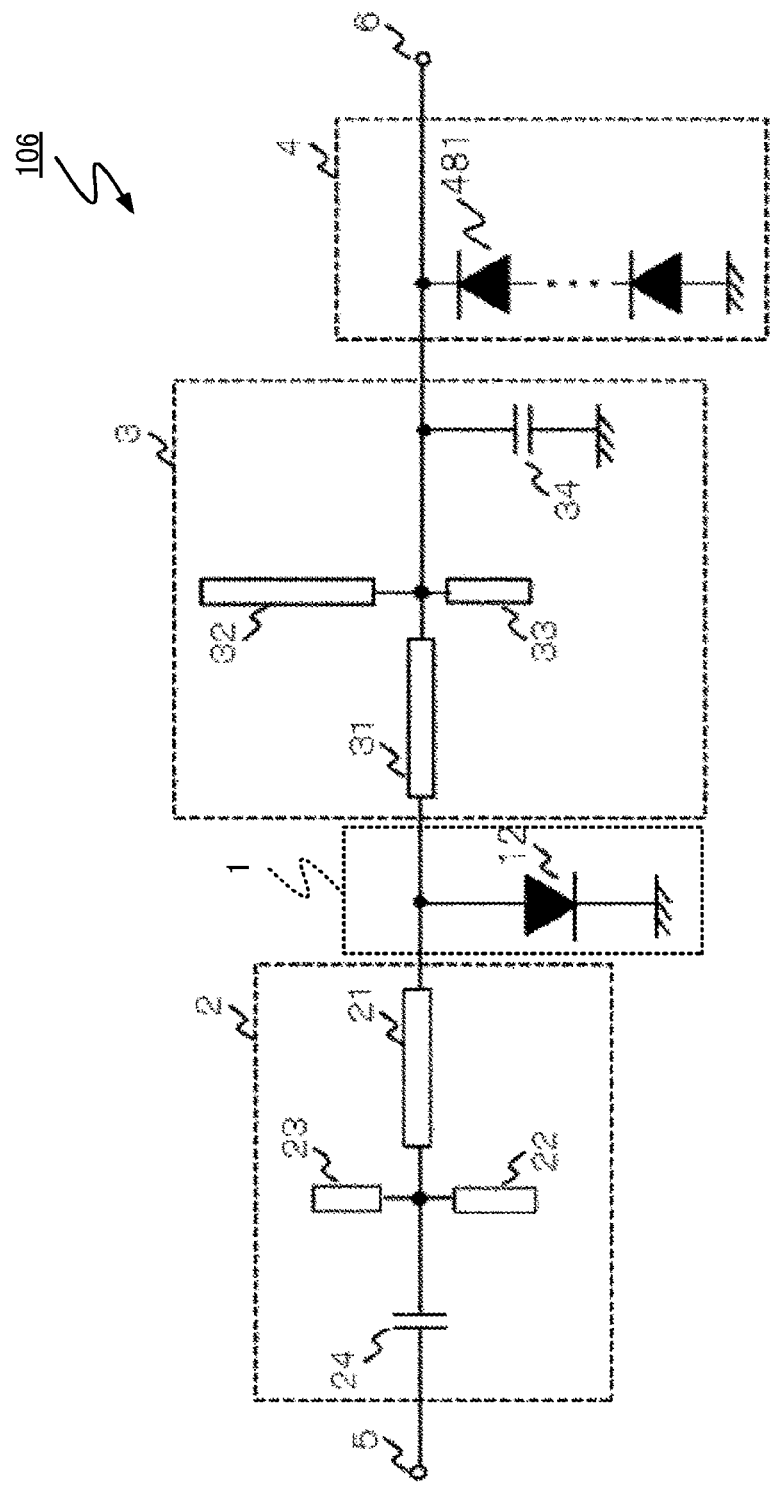
FIG. 21 is a diagram illustrating a third modified example of the circuit configuration of the rectifying device according to Embodiment 6.

As illustrated in FIG. 21, the rectifying device 106 may include, instead of the diode 48, at least one diode 481 connected in series. The forward direction of the at least one diode 481 connected in series is a direction from the other end that is grounded towards the one end connected to the connection point of the output filter 3 and the output terminal 6. The sum of threshold voltage of the diode 481 corresponds to the threshold voltage $V_{di\_th4}$ of the diode 48 illustrated in FIG. 20. Therefore, a change in the number of the diodes 481 can vary the threshold voltage $V_{di\_th4}$.

As described above, according to the rectifying devices 105 and 106 of the present Embodiment 6, the inclusion of the impedance changer 4 enables the reverse voltage applied across the rectifying element 11 to be less than or equal to the reverse withstand voltage of the rectifying element 11.

Embodiment 7

Figure 22:
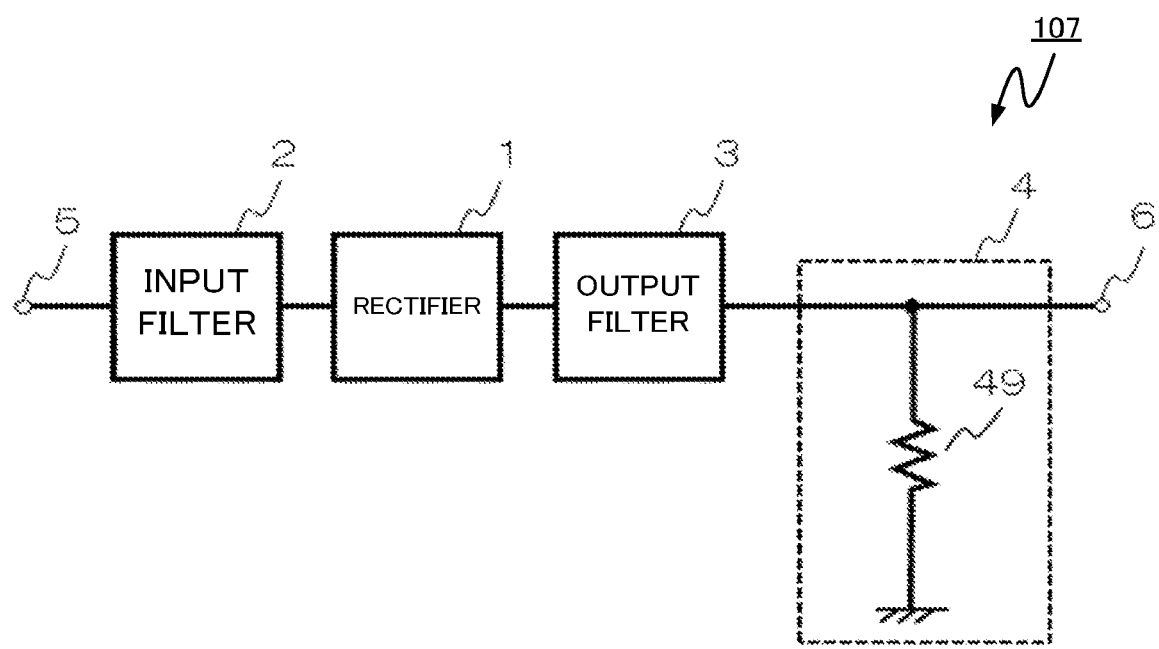
FIG. 22 is a diagram illustrating an example of a circuit configuration of a rectifying device according to Embodiment 7.

As described above, the rectifying device can be installed in any apparatus without limitation to installation in the rectenna apparatus 10. In addition, the circuit configuration of the rectifying device is not limited to that of the examples of Embodiments 1 to 6. The impedance changer 4 included in a rectifying device 107 according to Embodiment 7 and illustrated in FIG. 22 includes a thermistor 49 as an example of a circuit element with a resistance value that varies while having a negative correlation with respect to the temperature thereof.

Figure 23:
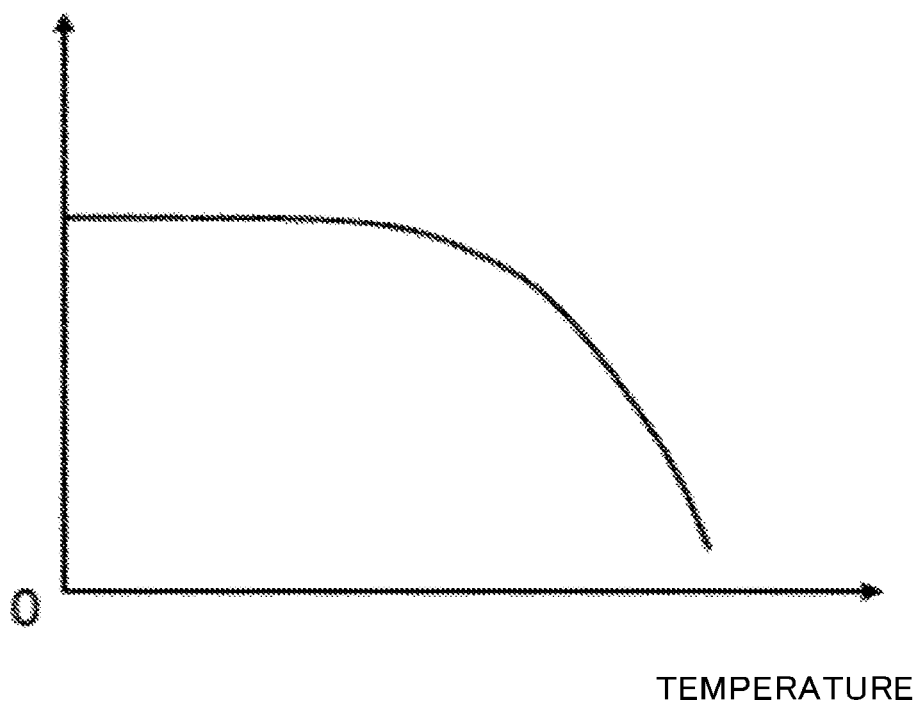
FIG. 23 is a diagram indicating a relation between a resistance value and temperature of a thermistor according to Embodiment 7.

FIG. 23 indicates relation between the resistance value and the temperature of the thermistor 49. The thermistor 49 is an element having characteristics such that resistance value decreases with an increase in temperature. That is, when electric current increases in accordance with an increase in voltage $V_{dc}$ output by the rectifying device 107, the resistance value of the thermistor 49 decreases due to temperature increase occurred by the electric current.

The operation of the rectifying device 107 is described below. When the high-frequency power input to the rectifying device 107 is sufficiently low, the voltage $V_{dc}$ and the electric current is low, and thus temperature is low. Thus, the impedance of the thermistor 49 is a value regarded as corresponding to an open circuit. With this configuration, the impedance of the circuit of the output side as viewed from the rectifying element 11 is that of the load connected to the output terminal 6. The direct current does not leak to thermistor 49, and thus the RF-DC conversion efficiency is obtained that is equivalent to that obtained in the case without the impedance changer 4.

As the high-frequency power input to the rectifying device 107 increases, the voltage $V_{dc}$ becomes high, and thus the electric current increases as the voltage $V_{dc}$ increases. The resistance value of the thermistor 49 decreases as temperature increases occurred by the increase in the electric current. The impedance of the circuit of the output side as viewed from the rectifier 1 is parallel impedance of the load connected to the output terminal 6 and the resistance value of the thermistor 49. That is, compared to the case with decreased high-frequency power, the impedance of the circuit of the output side as viewed from the rectifier 1 is low. When the impedance of the circuit of the output side as viewed from the rectifier 1 decreases, the amplitude of the high-frequency voltage applied across the rectifying element 11 and the voltage $V_{dc}$ decrease. Thus, even when the input high-frequency power increases, the reverse voltage applied across the rectifying element 11 can be suppressed.

As described above, according to the rectifying device 107 of the present Embodiment 7, the inclusion of the impedance changer 4 enables the reverse voltage applied across the rectifying element 11 to be less than or equal to the reverse withstand voltage of the rectifying element 11.

The present disclosure is not limited to the above-described embodiments. The input filter 2 and the output filter 3 may further include at least one of (i) an open stub having a line length corresponding to one quarter wavelength of an even-order harmonic and (ii) an open stub having a line length corresponding to one quarter wavelength of an odd-order harmonic.

The switching element included in the impedance changer 4 is not limited to the FET switch 40, and may be any switching element, such as a bipolar transistor, that switches the conductive state and non-conductive state of the electric path upon application of a control signal to a control terminal. In the above-described embodiments, the FET switch 40 that at $V_{FET\_th}$ instantly switches the electrically conductive state and the electrically non-conductive state of between the drain and the source of the FET switch 40, but a switching element having a moderate slope of the amount of impedance change with respect to voltage may be used. Such configuration suppresses overshooting of voltage and electrical current due to transient response.

The divider ratio of the voltage divider circuit included in the rectifying device 101 according to Embodiment 2 can be set freely. In addition, the voltage divider circuit performs dividing of voltage by any method such as resistance division and capacitance division.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-219950, filed on Nov. 15, 2017, the entire disclosure of which is incorporated by reference herein.

REFERENCE SIGNS LIST

1 Rectifier
2 Input filter
3 Output filter
4 Impedance changer
5 Input terminal
6 Output terminal
7 Antenna
10 Rectenna apparatus
11, 12 Rectifying element
21 Transmission line
22 Open stub
23 Open stub
24 Direct-current-blocking capacitance element
31 Transmission line
32 Open stub
33 Open stub
34 Smoothing capacitance element
40 FET switch
41, 42, 44, 45 Resistor
43, 46, 47, 48, 431, 461, 471, 481 Diode
49 Thermistor
100, 101, 102, 103, 104, 105, 106, 107 Rectifying device

The invention claimed is:

1. A rectifying device for converting high-frequency power input from an input terminal into direct current power and outputting the direct current power from an output terminal, the rectifying device comprising:
a rectifier including a rectifying element, the rectifier being configured to convert the high-frequency power into the direct current power and to output the direct current power to the output terminal; and
an impedance changer having one end connected to a connection point of the rectifier and the output terminal and another end to which reference voltage is applied such that impedance varies while having a negative correlation with respect to an absolute value of voltage of the direct current power,
wherein
when the absolute value of the voltage of the direct current power is greater than a predetermined value that is less than or equal to an absolute value of reverse withstand voltage of the rectifying element, the impedance of the impedance changer is a value regarded as corresponding to a short circuit as viewed from the rectifier, when the absolute value of the voltage of the direct current power is lower than the predetermined value, the impedance is a value regarded as corresponding to an open circuit as viewed from the rectifier, and the voltage of the direct current power converges to the predetermined value by switching, in accordance with the absolute value of the voltage of the direct current power, the short circuit and the open circuit of the impedance changer as viewed from the rectifier.

2. The rectifying device according to claim 1, wherein the impedance changer includes a switching element that switches an electrically conductive state and an electrically non-conductive state of an electric path upon application of a control signal to a control terminal.

3. The rectifying device according to claim 2, wherein the impedance changer further includes a voltage divider circuit that divides the voltage of the direct current power and applies the divided voltage to the control terminal.

4. The rectifying device according to claim 2, wherein the impedance changer further includes a pull-down circuit that applies to the control terminal ground voltage or negative voltage corresponding to the voltage of the direct current power.

5. The rectifying device according to claim 3, wherein the impedance changer further includes a pull-down circuit that applies to the control terminal ground voltage or negative voltage corresponding to the voltage of the direct current power.

6. The rectifying device according to claim 1, wherein the impedance changer includes at least one diode connected in series, the at least one diode connected in series having one end connected to the connection point of the rectifier and the output terminal and another end to which reference voltage is applied, when the voltage of the direct current power is positive voltage, a direction from the one end of the at least one diode connected to the connection point of the rectifier and the output terminal toward the another end of the at least one diode to which the reference voltage is applied is a forward direction of the at least one diode connected in series, and when the voltage of the direct current power is negative voltage, the direction from the one end of the at least one diode connected to the connection point of the rectifier and the output terminal toward the another end of the at least one diode to which the reference voltage is applied is a reverse direction of the at least one diode connected in series.

7. The rectifying device according to claim 1, wherein the impedance changer includes a circuit element with a resistance value, the resistance value varying while having a negative correlation with respect to temperature thereof.

8. A rectenna apparatus comprising:

an antenna to receive a high-frequency wave; and the rectifying device according to claim 1, the rectifying device being configured to convert the high-frequency power into the direct current power.

* * * * *